United States Patent
Park et al.

(10) Patent No.: US 10,548,039 B2
(45) Date of Patent: Jan. 28, 2020

(54) METHOD AND DEVICE FOR SELECTING CELL IN WIRELESS COMMUNICATION SYSTEM

(71) Applicant: LG ELECTRONICS INC., Seoul (KR)

(72) Inventors: Jonghyun Park, Seoul (KR); Kijun Kim, Seoul (KR); Inkwon Seo, Seoul (KR); Yunjung Yi, Seoul (KR); Youngtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 115 days.

(21) Appl. No.: 15/532,949

(22) PCT Filed: Dec. 3, 2015

(86) PCT No.: PCT/KR2015/013173
§ 371 (c)(1),
(2) Date: Jun. 2, 2017

(87) PCT Pub. No.: WO2016/089146
PCT Pub. Date: Jun. 9, 2016

(65) Prior Publication Data
US 2017/0366996 A1 Dec. 21, 2017

Related U.S. Application Data

(60) Provisional application No. 62/087,813, filed on Dec. 5, 2014.

(51) Int. Cl.
*H04W 24/10* (2009.01)
*H04L 5/00* (2006.01)
(Continued)

(52) U.S. Cl.
CPC .......... *H04W 24/10* (2013.01); *H04L 5/0048* (2013.01); *H04W 48/16* (2013.01);
(Continued)

(58) Field of Classification Search
CPC .................................................... H04W 24/10
(Continued)

(56) References Cited

U.S. PATENT DOCUMENTS 10,135,586 B2 * 11/2018 Han ...................... H04L 5/0048
2013/0279486 A1 * 10/2013 Kato ................. H04W 56/0005
370/336

(Continued)

FOREIGN PATENT DOCUMENTS

KR   1020090077640   7/2009
KR   1020120030549   3/2012
(Continued)

OTHER PUBLICATIONS

PCT International Application No. PCT/KR2015/013173, International Search Report dated Mar. 7, 2016, 3 pages.

*Primary Examiner* — Peter G Solinsky
(74) *Attorney, Agent, or Firm* — Lee Hong Degerman Kang & Waimey

(57) ABSTRACT

Disclosed are method and device for selecting a cell in a wireless communication system. In particular, a method for selecting a cell by a terminal in a wireless communication system comprises the steps of: transmitting a random access preamble in a cell, which is selected by a terminal, to a base station; receiving a random access response from the base station; and, as a response to the random access response, transmitting an uplink message to the base station through a physical uplink shared channel (PUSCH), wherein the
(Continued)

uplink message can comprises a radio resource management (RRM) measurement value which has been measured on the basis of a reference signal.

13 Claims, 13 Drawing Sheets

(51) Int. Cl.
    *H04W 48/16*     (2009.01)
    *H04W 72/04*     (2009.01)
    *H04W 74/08*     (2009.01)
    *H04W 88/02*     (2009.01)
    *H04W 88/08*     (2009.01)

(52) U.S. Cl.
    CPC ..... *H04W 72/044* (2013.01); *H04W 72/0413* (2013.01); *H04W 74/0833* (2013.01); *H04W 88/02* (2013.01); *H04W 88/08* (2013.01)

(58) Field of Classification Search
    USPC ........................................................ 370/252
    See application file for complete search history.

(56) References Cited

U.S. PATENT DOCUMENTS

| | | | |
|---|---|---|---|
| 2013/0303219 A1* | 11/2013 | Acharya | H04B 7/0632 455/509 |
| 2013/0303220 A1* | 11/2013 | Acharya | H04B 7/024 455/509 |
| 2015/0023197 A1* | 1/2015 | Iraji | H04W 48/16 370/252 |
| 2015/0036658 A1* | 2/2015 | Mochizuki | H04W 24/10 370/331 |
| 2015/0092768 A1* | 4/2015 | Ng | H04W 48/16 370/350 |
| 2015/0181543 A1* | 6/2015 | Hwang | H04W 56/002 370/336 |
| 2015/0215903 A1* | 7/2015 | Zhao | H04W 72/04 370/329 |
| 2015/0264592 A1* | 9/2015 | Novlan | H04L 27/2601 370/252 |
| 2015/0270936 A1* | 9/2015 | Han | H04L 5/0048 370/329 |
| 2015/0289155 A1* | 10/2015 | Gao | H04L 5/0057 370/252 |
| 2016/0037426 A1* | 2/2016 | Li | H04W 36/0094 370/332 |
| 2017/0064587 A1* | 3/2017 | Xu | H04W 36/0055 |

FOREIGN PATENT DOCUMENTS

| | | |
|---|---|---|
| KR | 1020130028101 | 3/2013 |
| KR | 1020130095785 | 8/2013 |
| WO | 2013135944 | 9/2013 |

\* cited by examiner

[FIG. 1]
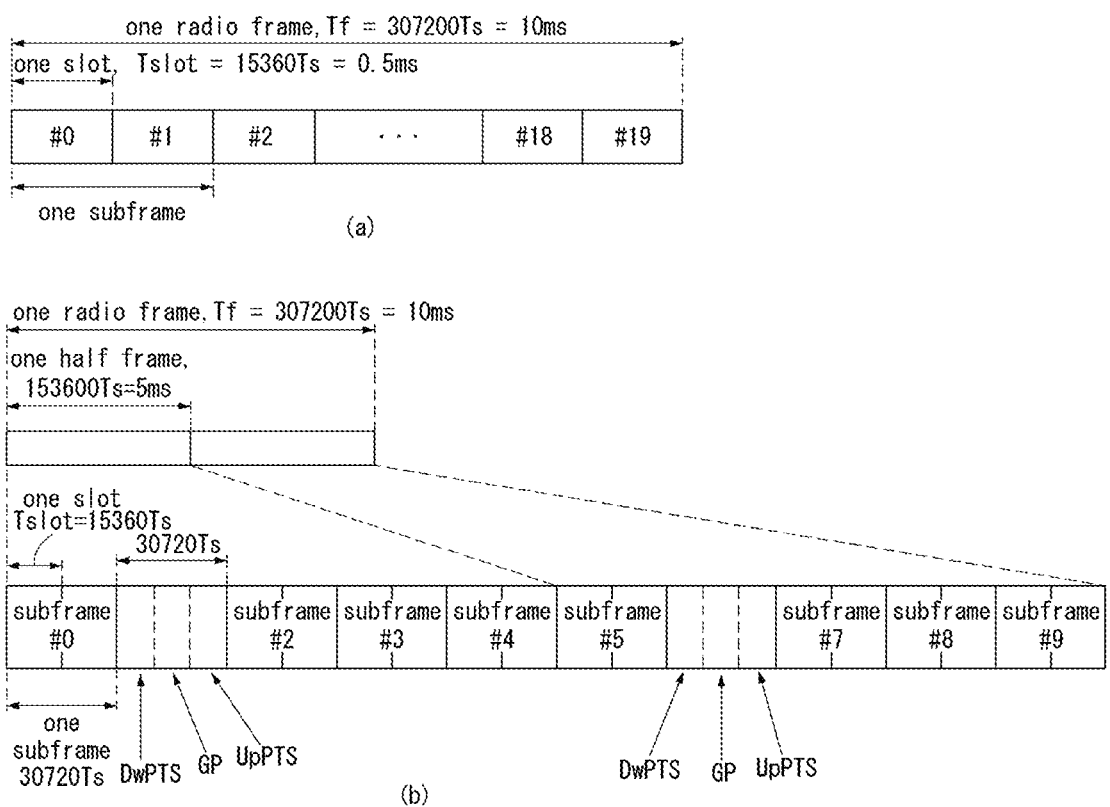

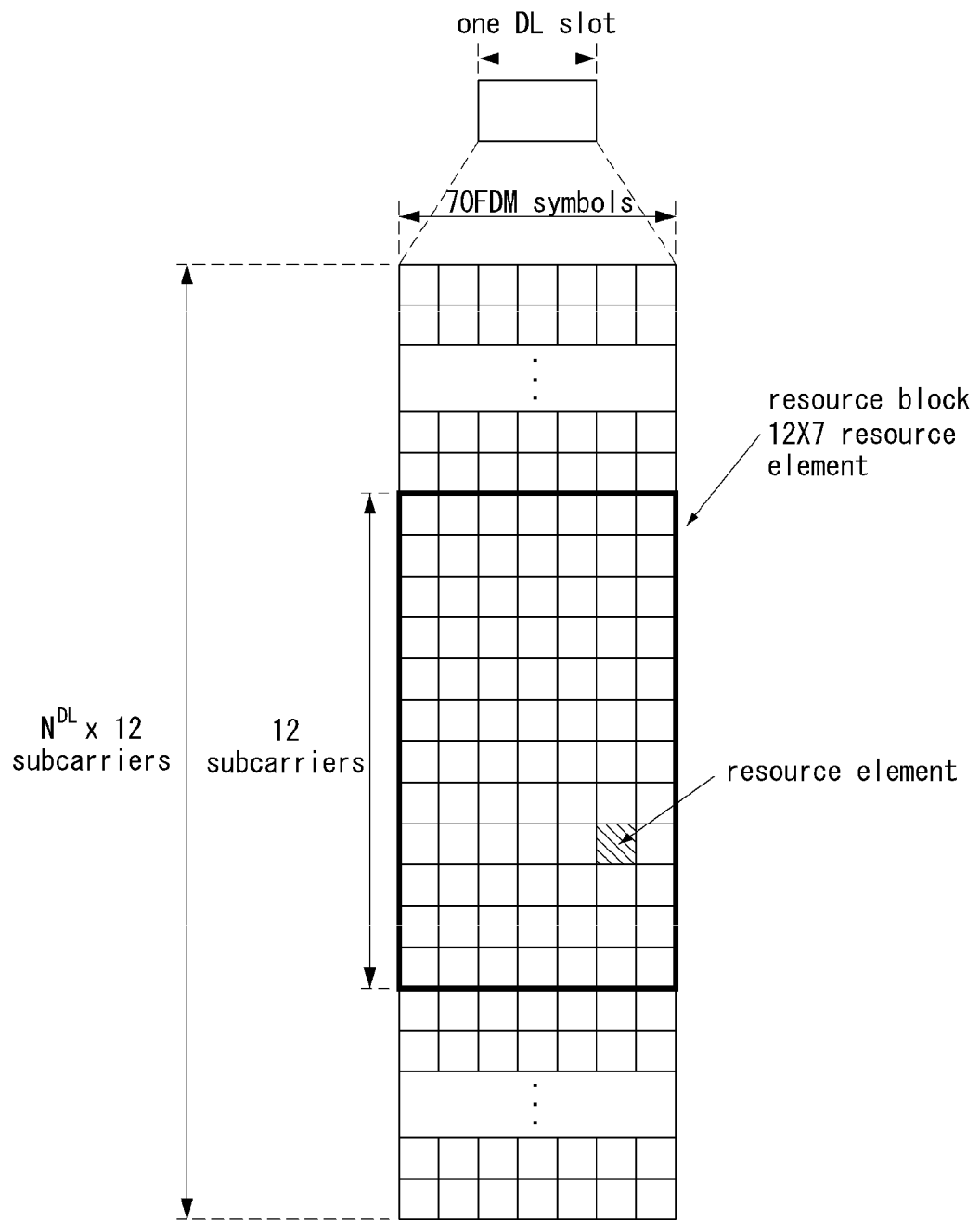
[FIG. 2]

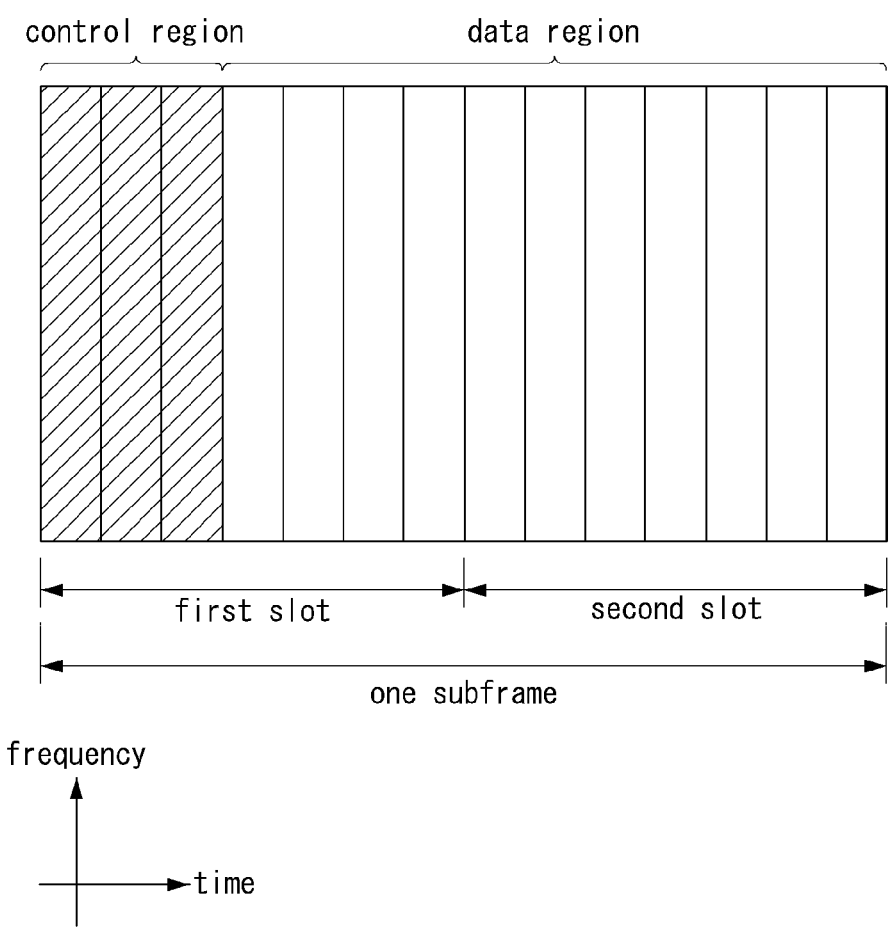
[FIG. 3]

【FIG. 4】
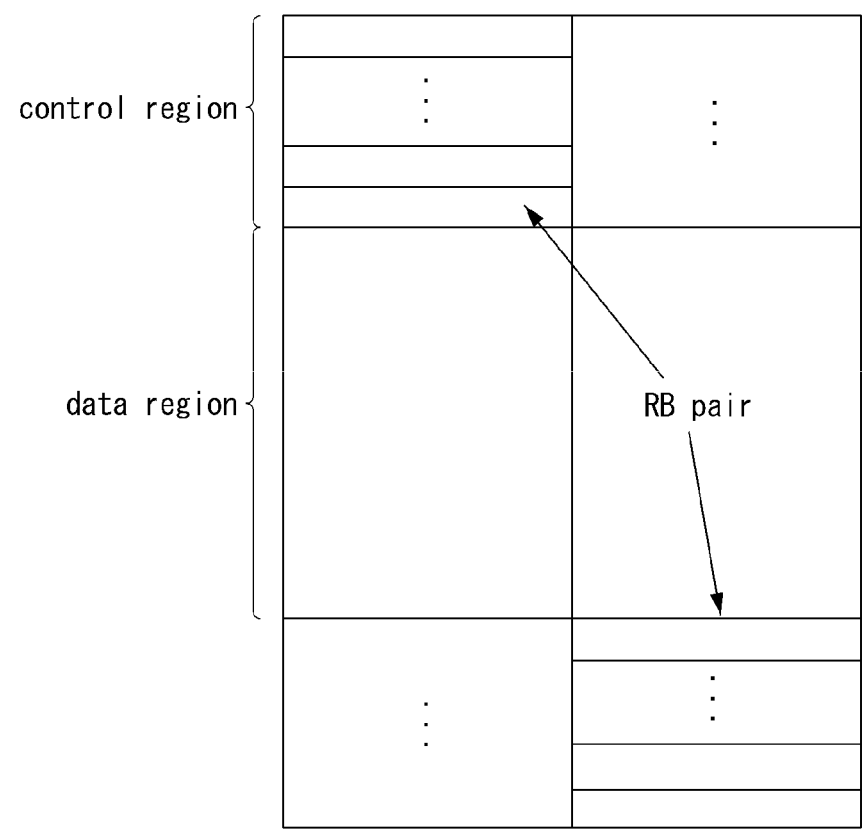
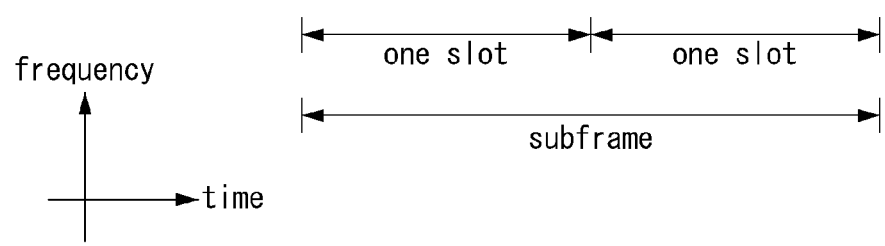

[FIG. 5]
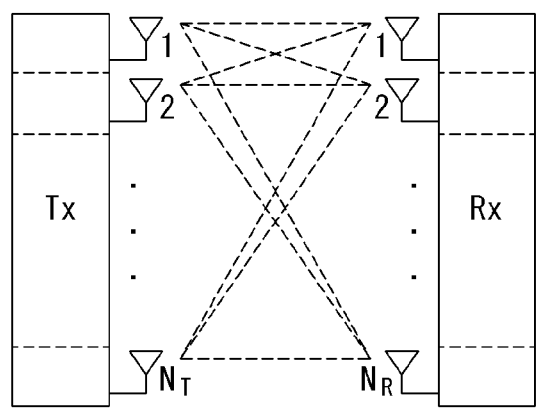
[FIG. 6]
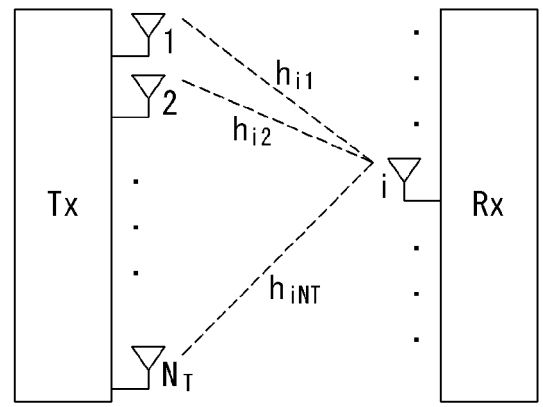

[FIG. 7]
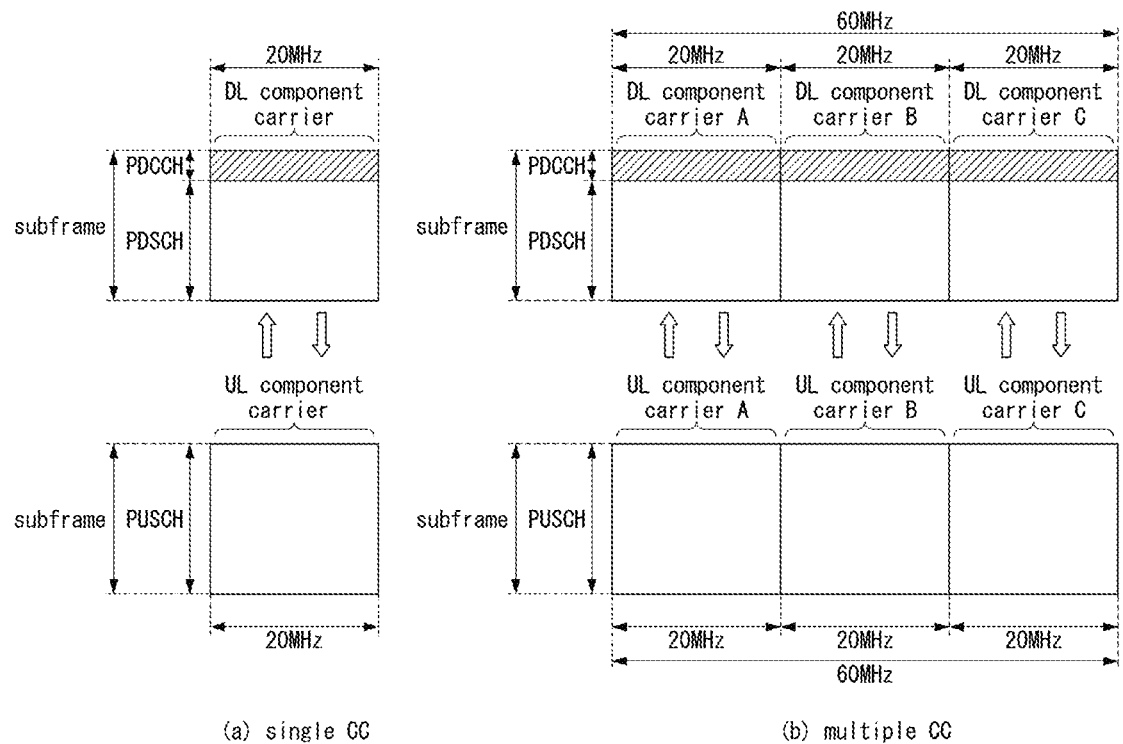
(a) single CC                 (b) multiple CC

[FIG. 8]
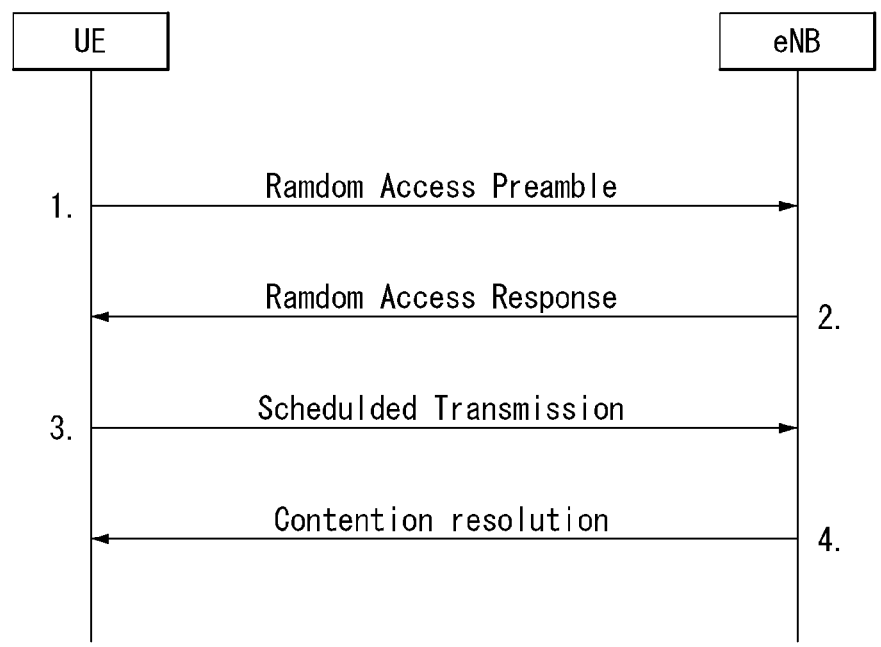

[FIG. 9]
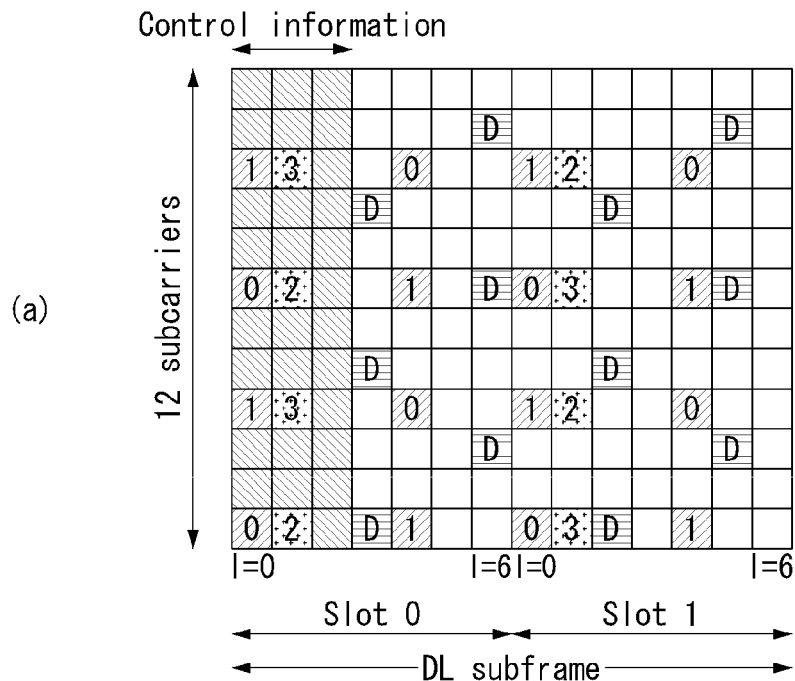
(a)
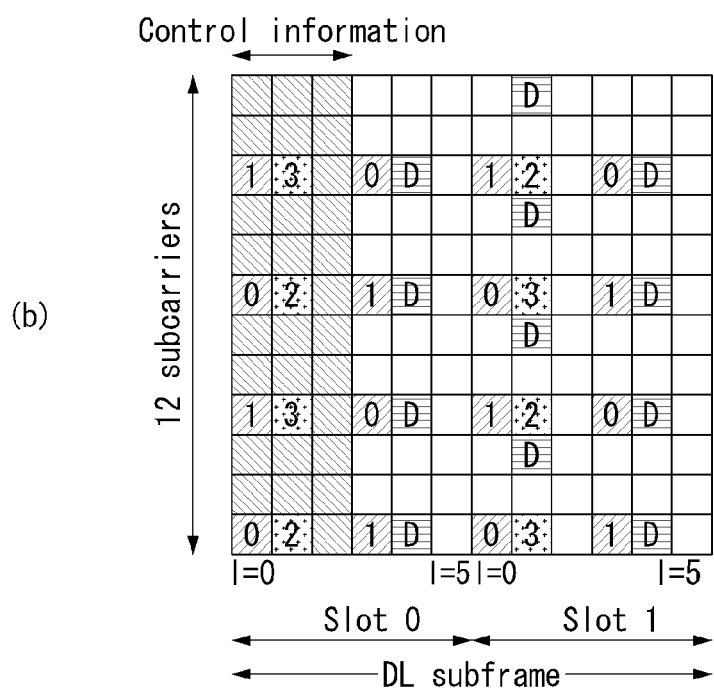
(b)

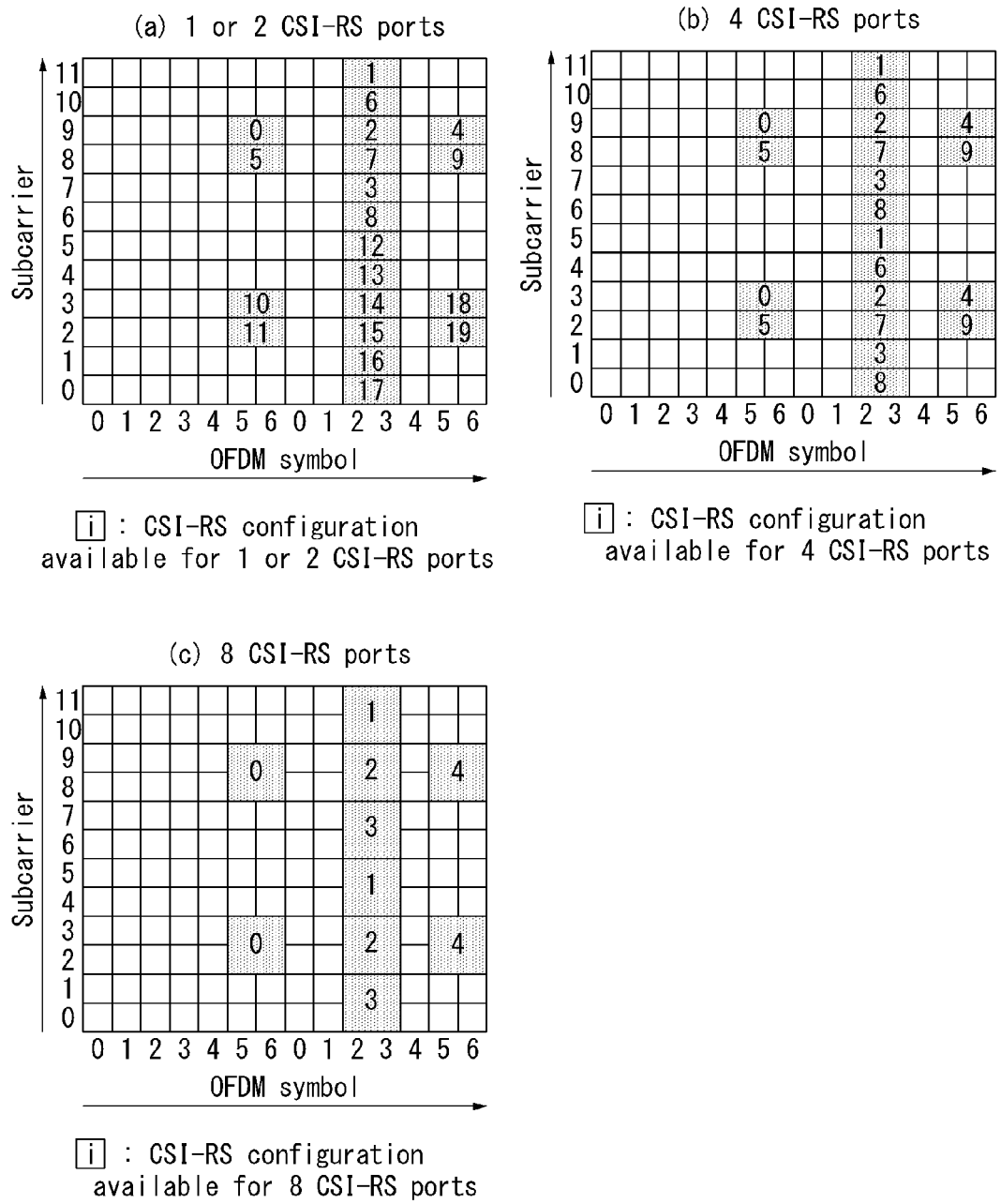

【FIG. 11】
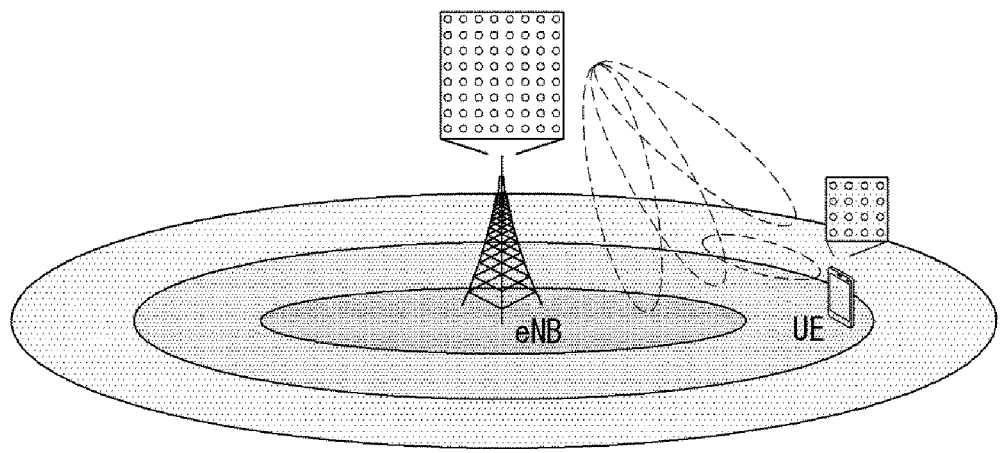
【FIG. 12】
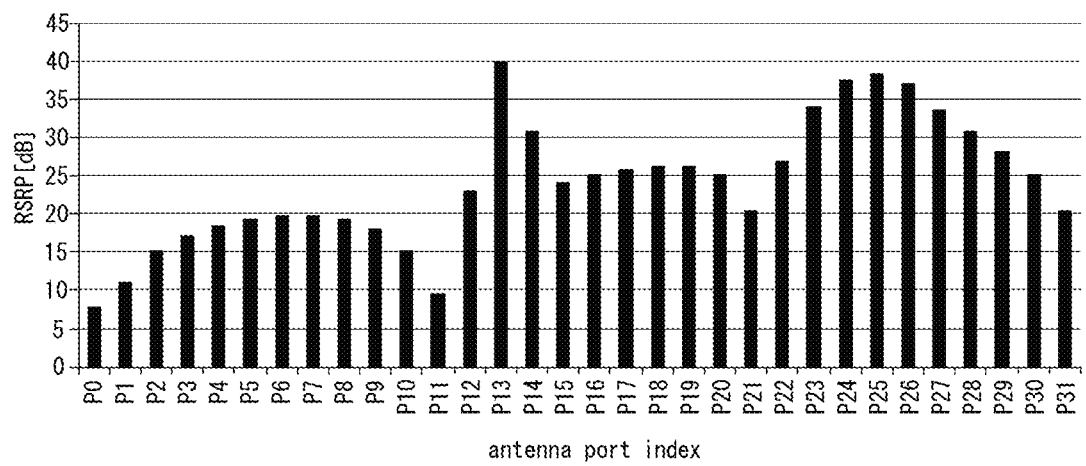
【FIG. 13】
| Group index for level 4 grouping | 0 | | | | | | | | 1 | | | | | | | |
|---|---|---|---|---|---|---|---|---|---|---|---|---|---|---|---|---|
| Group index for level 3 grouping | 0 | | | | 1 | | | | 2 | | | | 3 | | | |
| Group index for level 2 grouping | 0 | | 1 | | 2 | | 3 | | 4 | | 5 | | 6 | | 7 | |
| Group index for level 1 grouping | 0 | 1 | 2 | 3 | 4 | 5 | 6 | 7 | 8 | 9 | 10 | 11 | 12 | 13 | 14 | 15 |
| | P0 | P1 | P2 | P3 | P4 | P5 | P6 | P7 | P8 | P9 | P10 | P11 | P12 | P13 | P14 | P15 |

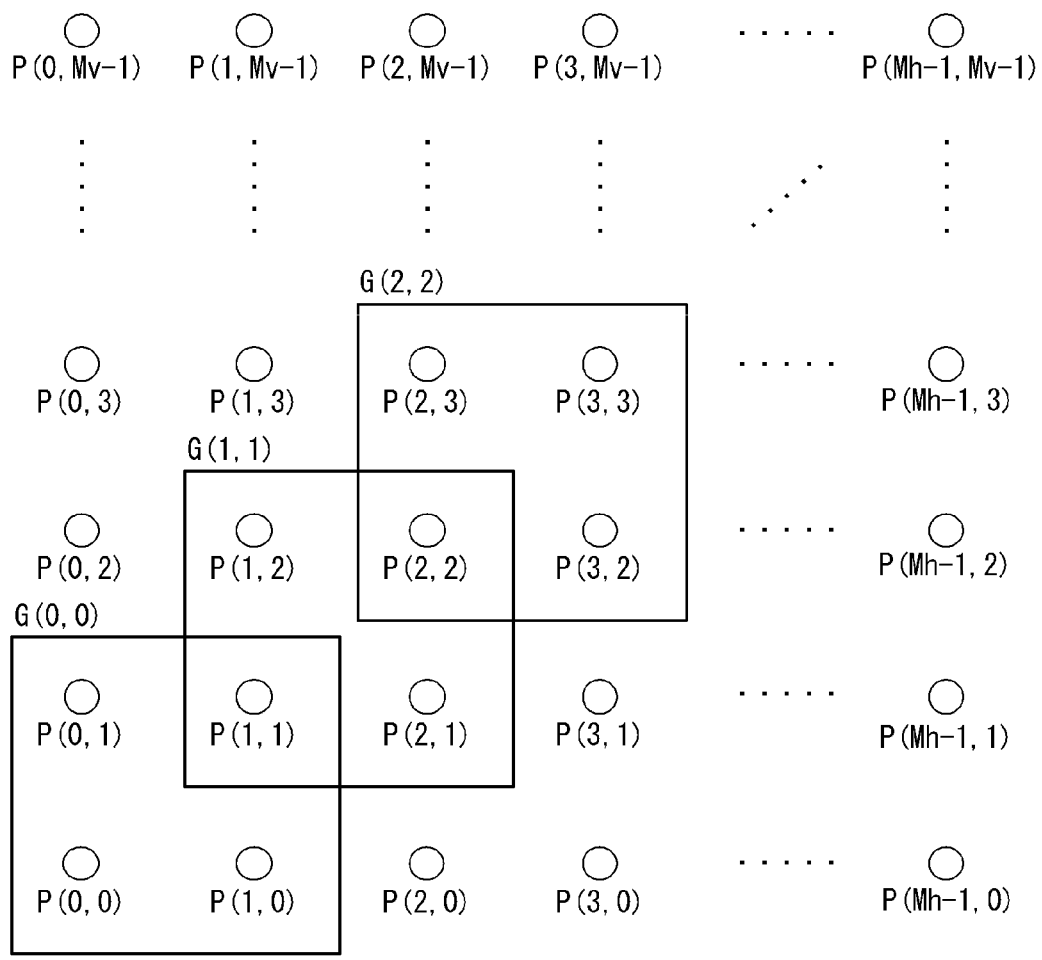
[FIG. 14]

【FIG. 15】
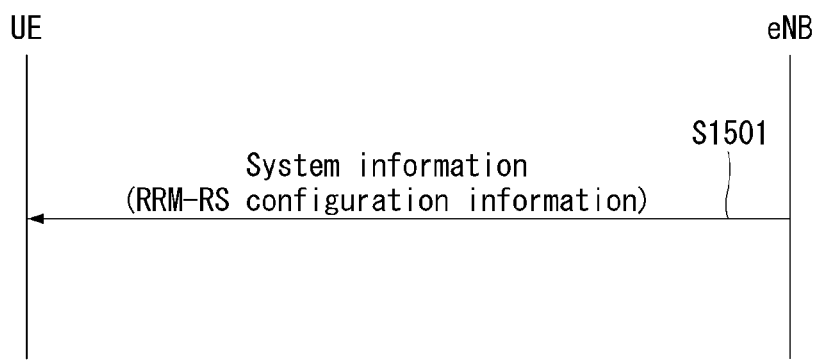
【FIG. 16】
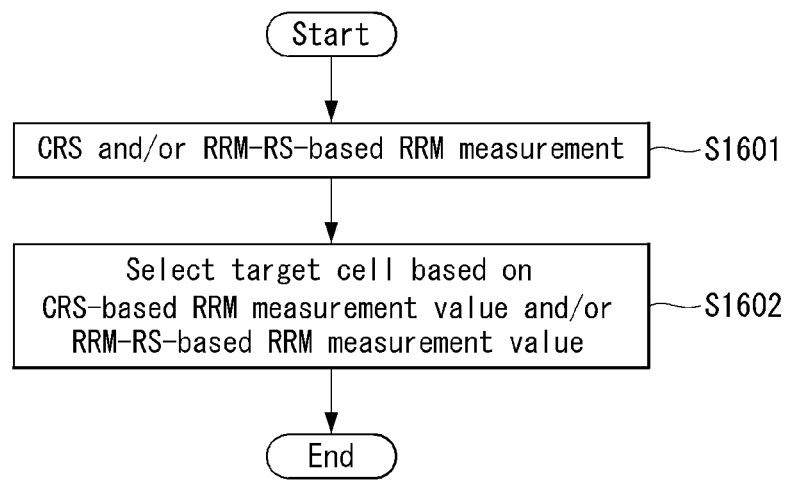

[FIG. 17]
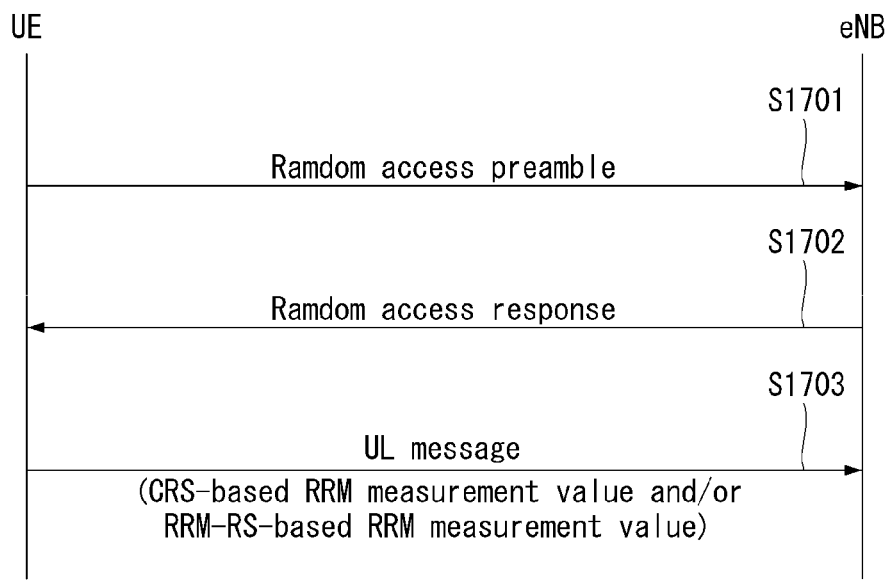
[FIG. 18]
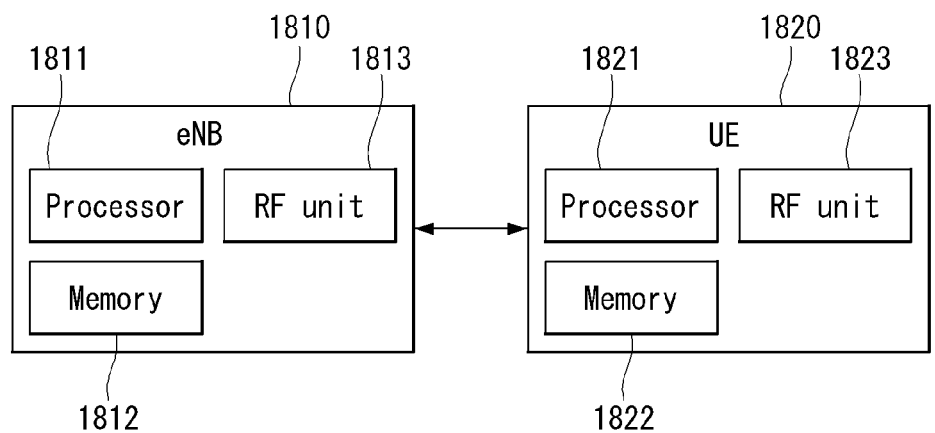

METHOD AND DEVICE FOR SELECTING CELL IN WIRELESS COMMUNICATION SYSTEM

CROSS-REFERENCE TO RELATED APPLICATIONS

This application is the National Stage filing under 35 U.S.C. 371 of International Application No. PCT/KR2015/013173, filed on Dec. 3, 2015, which claims the benefit of U.S. Provisional Application No. 62/087,813, filed on Dec. 5, 2014, the contents of which are all hereby incorporated by reference herein in their entirety.

TECHNICAL FIELD

The present invention relates to wireless communications, and more particularly, to a method for selecting a cell based on a reference signal in a user equipment and a device for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for (re)selecting a cell performed by a user equipment based on a reference signal (RRM-RS) for a Radio Resource Management (RRM) measurement configured separately from a Cell-specific Reference Signal (CRS) in a wireless communication system.

In addition, an object of the present invention is to propose a method for performing an initial access procedure to an optimal cell selected based on a RRM-RS.

Technical objects of the present invention are not limited to the above-described object and other technical objects that have not been described above will become evident to those skilled in the art from the following description.

Technical Solution

According to an aspect of the present invention, a method for selecting a cell by a user equipment in a wireless communication system may include transmitting a random access preamble to a base station on a cell selected by the user equipment, receiving a random access response from the base station, and transmitting an uplink message on a Physical Uplink Shared Channel (PUSCH) to the base station in response to the random access response, where the uplink message includes a Radio resource management (RRM) measurement value measured based on a reference signal (RS).

According to another aspect of the present invention, a user equipment for selecting a cell in a wireless communication system may include a radio frequency (RF) unit for transmitting and receiving a wireless signal and a processor for controlling the RF unit, wherein the processor is configured to perform: transmitting a random access preamble to a base station on a cell selected by the user equipment, receiving a random access response from the base station, and transmitting an uplink message on a Physical Uplink Shared Channel (PUSCH) to the base station in response to the random access response, where the uplink message includes a Radio resource management (RRM) measurement value measured based on a reference signal (RS).

Preferably, the RRM measured based on the RS may include a Cell-specific Reference Signal (CRS)-based RRM measurement value and/or a RRM-RS-based RRM measurement value configured for the RRM measurement except the CRS.

Preferably, the method may further include receiving a Physical Cell Identity (PCI) of a searched cell by the user equipment or a serving cell of the user equipment and system information including RRM-RS configuration information for each PCI of a neighbor cell.

Preferably, the RRM-RS configuration information may include one or more of RRM-RS antenna port number information, RRM-RS antenna port mapping information, RRM-RS transmission period and offset information, and RRM-RS transmission frequency/time resource information.

Preferably, a part of the RRM-RS configuration information may be preconfigured with being corresponding to the searched cell by the user equipment or the PCI of the serving cell and the neighbor cell of the user equipment.

Preferably, the cell may be selected based on the CRS-based RRM measurement value and/or the RRM-RS-based RRM measurement value for the searched cell by the user equipment or the serving cell and the neighbor cell of the user equipment.

Preferably, a cell that transmits a RRM-RS of which RRM-RS-based RRM measurement value is a greatest may be selected.

Preferably, when the CRS-based RRM measurement value for the cell that transmits a RRM-RS of which RRM-RS-based RRM measurement value is a greatest is smaller than the CRS-based RRM measurement value or other cell by more than a preconfigured threshold value, the cell that transmits a RRM-RS of which RRM-RS-based RRM measurement value is a greatest may not be selected.

Preferably, a cell of which a weighted average value between the RRM-RS-based RRM measurement value and the CRS-based RRM measurement value is a greatest may be selected.

Preferably, the cell may be selected based on the RRM-RS-based RRM measurement value among cells of which difference between a best CRS-based RRM measurement value and the CRS-based RRM measurement value for a measurement target cell is a preconfigured threshold value or less.

Preferably, the cell may be selected based on difference between a best CRS-based RRM measurement value and the CRS-based RRM measurement value for a measurement target cell, and difference between a best RRM-RS-based RRM measurement value and a best RRM-RS-based measurement value.

Preferably, the RRM may include a Reference signal receive power (RSRP) and/or a Reference signal received quality (RSRQ).

Preferably, the RRM-RS may be one of a Channel State Information-Reference Signal (CSI-RS), a Discovery Reference Signal (DRS), a precoded reference signal and a reference signal transmitted in an amorphous cell including a number of different cells or transmission points.

Technical Effects

According to an embodiment of the present invention, in a wireless communication system, particularly, in the environment in which a full-dimension MIMO is used or an amorphous cell is supported, an optimal cell that has the most efficiency for a user equipment may be selected.

In addition, according to an embodiment of the present invention, a user equipment initially accesses to an optimal cell that has the most efficiency, and accordingly, the latency during the initial access procedure of the user equipment may be minimized.

In addition, according to an embodiment of the present invention, a user equipment initially accesses to an optimal cell that has the most efficiency, and accordingly, there is an advantage that the user equipment may enter a normal operation state quickly without additional handover or cell re-selection procedure.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 shows an example of component carriers and a carrier aggregation in a wireless communication system to which an embodiment of the present invention may be applied.

FIG. 8 is a diagram for describing a contention-based random access procedure in a wireless communication system to which the present invention may be applied.

FIG. 9 illustrates a reference signal pattern mapped to a downlink resource block pair in the wireless communication system to which the present invention can be applied.

FIG. 10 is a diagram illustrating the CSI-RS configuration in a wireless communication system to which the present invention may be applied.

FIG. 11 illustrates a system in which an eNB or a UE has a plurality of transmission/reception antennas capable of the AAS based 3D beam formation.

FIG. 12 illustrates the RSRP for the antenna port of the RRM-RS according to an embodiment of the present invention.

FIG. 13 illustrates an example of the RRM-RS antenna port grouping level according to an embodiment of the present invention.

FIG. 14 is a diagram illustrating an antenna port of the RRM-RS arranged with 2D index and the antenna port group according to an embodiment of the present invention.

FIG. 15 is a diagram illustrating an RRM-RS-based cell selection method according to an embodiment of the present invention.

FIG. 16 is a diagram illustrating an RRM measurement method according to an embodiment of the present invention.

FIG. 17 is a diagram illustrating a random access procedure according to an embodiment of the present invention.

FIG. 18 illustrates a block diagram of a wireless communication apparatus according to an embodiment of the present invention.

BEST MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(*a*) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, a length of a subframe i may be 1 ms and a length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(*b*) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

(DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \qquad \text{[Equation 2]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T \qquad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \qquad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \qquad \text{[Equation 8]}$$

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \ldots, n_{N_R}]^T \qquad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnection-Reconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 7 shows an example of component carriers and a carrier aggregation in a wireless communication system to which an embodiment of the present invention may be applied.

FIG. 7a shows the structure of a single carrier used in an LTE system. A component carrier includes a DL CC and an UL CC. One component carrier may have a frequency range of 20 MHz.

FIG. 7b shows the structure of a carrier aggregation used in an LTE-A system. FIG. 7b shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Random Access Procedure

Hereinafter, a random access procedure which is provided in a LTE/LTE-A system will be described.

The random access procedure is used in order for a UE to obtain the UL synchronization with an eNB or to be allocated with UL radio resource. After turning on the power of UE, the UE acquires the DL synchronization with an initial cell and receives the system information. The UE obtains the information of the set of available random access preamble and that of the radio resource which is used for the transmission of random access preamble. The radio resource that is used for the transmission of random access preamble may be specified as the combination of at least one subframe index and an index on the frequency domain. The UE transmits the random access preamble that is randomly selected from the set of random access preamble, and the eNB that receives the random access preamble transmits the timing alignment (TA) value for the UL synchronization to the UE through the random access response. The UE acquires the UL synchronization in this way.

The random access procedure shows common in frequency division duplex (FDD) and time division duplex (TDD). The random access procedure is irrelevant to the cell size, and the number of serving cell in case of the carrier aggregation being configured.

First, the following shows the case that a UE performs the random access procedure.

In case that the UE performs an initial access in a RRC idle state without any RRC connection to an eNB In case that the UE performs a RRC connection re-establishment procedure In case that the UE attempts to an initial access to a target cell in a handover procedure In case that an random access procedure is requested by the order from eNB In case that there is any data that is going to be transmitted to UL in a non-synchronized condition during the RRC connected state In case that there is any data that is going to be transmitted to UL in a non-synchronized condition and in a condition that the radio resource designated for requesting the radio resource is not allocated during the RRC connected state In case that the UE positioning is performed in a condition that timing advance is required during the RRC connected state In case that restoration procedure is performed in a radio link failure or handover failure In 3GPP Rel-10, it is considered that the timing advance (TA) value that is applicable to a specific cell (for example, PCell) in a wireless access system that supports the carrier aggregation is applied to a plurality of cells in common. However, the UE may aggregate a plurality of cells that are included in different frequency bands (that is, spaced apart on the frequency domain) or a plurality of cells that have different propagation characteristics. In addition, in case of a specific cell, for the extension of coverage or the removal of coverage hole, in a condition that small cells such as a remote radio header (RRH) (that is, repeater), a femto cell, or a pico cell, etc. or a secondary eNB (SeNB) is arranged in the cell, the UE performs a communication with the eNB (that is, macro eNB), in case of performing the communication with the secondary eNB through another cell, a plurality of cell may have different characteristics of the propagation delay. In this case, if the UL transmission is performed in a way that one TA value is commonly applied to a plurality of cells, it may profoundly affect the synchronization of UL signals that are transmitted on a plurality of cells. Accordingly, it may be desired to have a plurality of TAs in a condition of the CA that a plurality of cells are aggregated, and in 3GPP Rel-11, considered to allocate the TA independently in a specific cell group unit for supporting multiple TA. It is referred to as TA group (TAG), the TAG may include one or more cell(s), and the same TA may be commonly applied in one more cell(s) that are included in the TAG. For supporting the multiple TA, the MAC TA command control element is configured with 2-bit TAG ID and 6-bit TAG command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, may be applied to all the cells within the pTAG. Meanwhile, in case of TAG (that is, secondary TAG (sTAG)) that is configured with SCells only, the TA, which is determined based on a specific SCell within sTAG, may be applied to all the cells within the relevant sTAG, and in this time, the TA may be acquired through the random access procedure by being initiated by the eNB. Particularly, the SCell in the sTAG is configured to be a (Random Access Channel) RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using RA-RNTI. The TA that is determined based on SCell that successfully completes the random access may be applied to all the cells in the relevant sTAG by the UE. Like this, the random access procedure may be performed in SCell as well in order to acquire timing alignment of the sTAG to which the relevant SCell belongs.

The LTE/LTE-A system provides both of the contention-based random access procedure that the UE randomly selects to use one preamble in a specific set and the non-contention-based random access procedure that the eNB uses the random access preamble that is allocated to a specific UE. However, the non-contention-based random access procedure, the handover procedure previously described, may be used only for the UE positioning and/or the timing advance alignment for the sTAG in case of being requested by the order of eNB. After the random access procedure is completed, a normal UL/DL transmission is made.

In the meantime, relay node (RN) also supports both of the contention-based random access procedure and the non-contention-based random access procedure. When the relay node performs the random access procedure, the RN suspends the subframe configuration at the moment. That is, it means that the RN subframe configuration is temporarily terminated. But, the RN subframe configuration is initiated at the time when the random access procedure has been successfully completed.

FIG. 8 is a diagram for describing a contention-based random access procedure in a wireless communication system to which the present invention may be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The random access preamble is transmitted by 6 bits in the RACH transmission channel, and the 6-bit consists of 5-bit random identity for identifying the RACH transmitted UE and the rest 1-bit (for example, indicating the size of msg 3) for representing additional information.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the relevant UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary C-RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, attempts to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit (PDU) and the MAC PDU may be delivered through PDSCH. It is desirable to include the information of UE that is to receive the PDSCH, frequency and the time information of the PDSCH radio resource, and transmission type of the PDSCH etc in the PDCCH. As described above, if succeeding in detecting the PDCCH that is transmitted to the UE itself, the UE may receive properly the random access response that is transmitted to the PDSCH according to the PDCCH information.

The random access response window represents the maximum time section when the UE that transmits the preamble is waiting for the random access response message. The random access response window has the length of 'ra-ResponseWindowSize', which starts from the subframe after 3 subframes from the last subframe in which the preamble is transmitted. That is, the UE is waiting for receiving the random access response during the random access window secured after 3 subframes from the subframe in which the preamble transmission is completed. The UE may acquire the random access window size ('ra-ResponseWindowsize') parameter value through the system information, and the random access window size may be determined as a value from 2 to 10.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

As described above, the reason why the random access preamble index is needed in the random access response is that one random access response may include the random access response information for one or more UEs, and so there is required an index to instruct for which UE the above UL grant, TC-RNTI, and TAC are available.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB. In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. In the content based random access procedure, the eNB may not identify which UEs perform the random access procedure, but the eNB is required to identify the UE in order to solve the collision later on.

There are two ways how to include the identifier of UE. The first method is that the UE transmits the cell identifier of its own through the UL transmission signal corresponding to the UL grant, if the UE has a valid C-RNTI that is already allocated by the relevant cell before the random access procedure. Meanwhile, if the UE has not been allocated a valid C-RNTI before the random access procedure, the UE transmits including unique identifier of its own (for example, S-TMSI or random number). Normally the above unique identifier is longer that C-RNTI. For the transmission on the UL-SCH, the UE-specific scrambling is used. However, if the UE has not been allocated C-RNTI yet, the scrambling is not based on the C-RNTI but uses TC-RNTI that is received from the random access response instead. If transmitting the data corresponding to the UL grant, the UE renews a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the relevant UE. Herein, the 4 message may correspond to the RRC connection setup message including C-RNTI.

The UE waits for the instruction of eNB in order to solve the collision after transmitting the data including the identifier of its own through the UL grant included the random access response. That is, the UE attempts the receipt of PDCCH in order to a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE judges that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure judging that a normal procedure has been performed. The UE acquires C-RNTI through the 4 message, and after that, the UE and network are to transmit and receive a UE-specific message by using the C-RNTI.

The following is a description of the way how to solve a collision in the random access.

The reason why a collision is occurred in performing the random access is that the number of random access preamble is limited basically. That is, it is not available that the eNB assigns a unique random access preamble for the UE to all the UEs, and the UE should randomly select one among the common random access preambles and transmit. According to this, a case is occurred that two or more UEs select the identical random access preamble through the identical radio resource (PRACH resource) and transmit, but the eNB recognizes it as one random access preamble that is transmitted from one UE. Accordingly, the eNB transmits the random access response to the UE and the random access response is supposed to be received by one UE. However, as described above, as there is a possibility that a collision is occurred, two or more UEs are going to receive one random access response, and according to this, each UE performs an operation by the receipt of random access response. That is, there is a problem that two or more UEs transmit different data to the same radio resource by using one UL grant included in the random access response. According to this, the data transmission might be all failed, and depending on the location of UEs or transmission power, the data of a specific UE only may be received by the eNB. In the latter case, as all of the two or more UEs assume that the data transmission of its own are succeeded, the eNB should inform the fact to the relevant UEs that they are failed in contention. That is, what to inform the fact of the failure or success in contention is referred to as contention resolution.

There are two ways of contention resolution. The one is to use the contention resolution timer, and the other is to transmit the identifier of successful UE to UEs. The former is applied to the case that the UE already has a unique C-RNTI before the random access procedure. That is, the UE that already has the C-RNTI transmits the data including the C-RNTI of itself according to the random access response and operates the contention resolution timer. And if the PDCCH information that is addressed by the C-RNTI of its own is received before the contention resolution timer is terminated, the UE determines itself to succeed in the contention and normally terminates the random access. In the contrary, if the PDCCH information that is addressed by the C-RNTI of its own is not received before the contention resolution timer is terminated, the UE determines itself to fail in the contention and renews the random access procedure, or informs the fact of failure to the higher layer. In the latter case of the ways of contention resolution, that is, the case that is to transmit the identifier of successful UE, is used for what the UE does not have a unique C-RNTI before the random access procedure. That is, in case that the UE itself does not have C-RNTI, the UE transmits including a higher identifier (S-TMSI or random number) more than the C-RNTI of data according to the UL Grant information included in the random access response, and operates the contention resolution timer. In case that the data including the higher identifier of its own is transmitted to DL-SCH before the contention resolution timer is terminated, the UE judges that the random access procedure is successful. On the other hand, in case that the data including the higher identifier of its own is not transmitted to DL-SCH before the contention resolution timer is terminated, the UE judges that the random access procedure is failed.

Meanwhile, the operation of the non-contention-based random access procedure, unlike the contention-based random access procedure illustrated in FIG. 8, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transceiving efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal used for a data demodulation for a specific terminal. Information for demodulation and channel measurement may be provided by using the reference signals. That is, the dedicated reference signal is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The dedicated reference signal may be transmitted through resource elements when data demodulation on the PDSCH is required. The terminal may receive whether the DRS is present through the upper layer and is valid only when the corresponding PDSCH is mapped. The dedicated reference signal may be referred to as the UE-specific RS or the demodulation RS (DMRS).

FIG. 9 illustrates a reference signal pattern mapped to a downlink resource block pair in the wireless communication system to which the present invention can be applied.

Referring to FIG. 9, as a unit in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 9*a*) and a length of 12 OFDM symbols in the case of an extended cyclic prefix (CP) (FIG. 9*b*). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

The LTE-A system which is an evolved version of the LTE system should support maximum eight transmitting antennas for downlink transmission. Accordingly, reference signals for maximum eight transmitting antennas should also be supported. In the LTE system, since the downlink reference signals are defined for maximum four antenna ports, if the base station includes at least 4 downlink transmitting antennas or maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band each subframe. However, in the LTE-A system, if reference signal patterns for maximum eight transmitting antennas are added to full band per subframe in the same manner as the CRS of the existing LTE system, the RS overhead becomes too great.

Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, a UE should have knowledge of the information for each of the CSI-RS antenna ports in the cell to which UE belongs such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When an eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When an eNB notifies the information of the CSI-RS to the UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

The CSI-RS is transmitted through 1, 2, 4 or 8 antenna ports. In this case, the antenna port which is used is p=15, p=15,16, p=15, . . . , 18, p=15, . . . , 22. The CSI-RS may be defined only for the subcarrier interval $\Delta f=15$ kHz.

(k', l') (herein, k' is a subcarrier index in a resource block, and l' represents an OFDM symbol index in a slot) and the condition of n_s is determined according to the CSI-RS configuration shown in Table 3 or Table 4 below.

Table 3 exemplifies the mapping of (k', l') according to the CSI-RS configuration for the normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 exemplifies the mapping of (k', l') according to the CSI-RS configuration for the extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |

TABLE 4-continued

| CSI reference | Number of CSI reference signals configured | | | | | |
|---|---|---|---|---|---|---|
| signal | 1 or 2 | | 4 | | 8 | |
| configuration | (k', l') | $n_s$ mod 2 | (k', l') | $n_s$ mod 2 | (k', l') | $n_s$ mod 2 |
| 25 | (2, 1) | 1 | | | | |
| 26 | (1, 1) | 1 | | | | |
| 27 | (0, 1) | 1 | | | | |

Referring to Table 3 and Table 4, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

The CSI-RS configuration is different depending on the number of antenna ports in a cell and the CP, neighboring cells may have different configurations to the maximum. In addition, the CSI-RS configuration may be divided into the case of being applied to both the FDD frame and the TDD frame and the case of being applied to only the TDD frame.

Based on Table 3 and Table 4, (k', l') and n_s are determined according to the CSI-RS configuration, and the time-frequency resource that each CSI-RS antenna port uses for transmitting the CSI-RS is determined.

FIG. 10 is a diagram illustrating the CSI-RS configuration in a wireless communication system to which the present invention may be applied.

FIG. 10(a) shows twenty CSI-RS configurations that are usable in the CSI-RS transmission through one or two CSI-RS antenna ports, and FIG. 10(b) shows ten CSI-RS configurations that are usable by four CSI-RS antenna ports. FIG. 10(c) shows five CSI-RS configurations that are usable in the CSI-RS transmission through eight CSI-RS antenna ports.

As such, according to each CSI-RS configuration, the radio resource (i.e., RE pair) in which the CSI-RS is transmitted is determined.

When one or two CSI-RS antenna ports are configured for transmitting the CSI-RS for a specific cell, the CSI-RS is transmitted on the radio resource according to the configured CSI-RS configuration among twenty CSI-RS configurations shown in FIG. 10(a).

Similarly, when four CSI-RS antenna ports are configured for transmitting the CSI-RS for a specific cell, the CSI-RS is transmitted on the radio resource according to the configured CSI-RS configuration among ten CSI-RS configurations shown in FIG. 10(b). In addition, when eight CSI-RS antenna ports are configured for transmitting the CSI-RS for a specific cell, the CSI-RS is transmitted on the radio resource according to the configured CSI-RS configuration among five CSI-RS configurations shown in FIG. 10(c).

The CSI-RS for each of the antenna ports is transmitted with being CDM to the same radio resource for each of two antenna ports (i.e., {15,16}, {17,18}, {19,20}, {21,22}). As an example of antenna ports 15 and 16, although the respective CSI-RS complex symbols are the same for antenna ports 15 and 16, the CSI-RS complex symbols are mapped to the same radio resource with being multiplied by different orthogonal codes (e.g., Walsh code). To the complex symbol of the CSI-RS for antenna port 15, [1, 1] is multiplied, and [1, −1] is multiplied to the complex symbol of the CSI-RS for antenna port 16, and the complex symbols are mapped to the same radio resource. This procedure is the same for antenna ports {17,18}, {19,20} and {21,22}.

A UE may detect the CSI-RS for a specific antenna port by multiplying a code multiplied by the transmitted code. That is, in order to detect the CSI-RS for antenna port 15, the multiplied code [1 1] is multiplied, and in order to detect the CSI-RS for antenna port 16, the multiplied code [1 −1] is multiplied.

Referring to FIGS. 10(a) to (c), when a radio resource is corresponding to the same CSI-RS configuration index, the radio resource according to the CSI-RS configuration including a large number of antenna ports includes the radio resource according to the CSI-RS configuration including a small number of antenna ports. For example, in the case of CSI-RS configuration 0, the radio resource for eight antenna ports includes all of the radio resource for four antenna ports and one or two antenna ports.

A plurality of CSI-RS configurations may be used in a cell. Zero or one CSI-RS configuration may be used for the non-zero power (NZP) CSI-RS, and zero or several CSI-RS configurations may be used for the zero power CSI-RS.

A UE presumes the zero power transmission for the REs (except the case of being overlapped with the RE that presumes the NZP CSI-RS that is configured by a high layer) that corresponds to four CSI-RS column in Table 3 and Table 4 above, for every bit that is configured as '1' in the Zero Power CSI-RS (ZP-CSI-RS) which is the bitmap of 16 bits configured by a high layer. The Most Significant Bit (MSB) corresponds to the lowest CSI-RS configuration index, and the next bit in the bitmap corresponds to the next CSI-RS configuration index in order.

The CSI-RS is transmitted in the downlink slot only that satisfies the condition of (n_s mod 2) in Table 3 and Table 4 above and the CSI-RS subframe configuration.

In the case of frame structure type 2 (TDD), in the subframe that collides with a special subframe, SS, PBCH or SIB 1 (SystemInformationBlockType1) message transmission or the subframe that is configured to transmit a paging message, the CSI-RS is not transmitted.

In addition, the RE in which the CSI-RS for a certain antenna port that is belonged to an antenna port set S (S(S={15}, S={15,16}, S={17,18}, S={19,20} or S={21, 22})) is transmitted is not used for transmitting the PDSCH or the CSI-RS of another antenna port.

Since the time-frequency resources used for transmitting the CSI-RS is unable to be used for transmitting data, the data throughput decreases as the CSI-RS overhead increases. Considering this, the CSI-RS is not configured to be transmitted in every subframe, but configured to be transmitted in a certain transmission period that corresponds to a plurality of subframes. In this case, the CSI-RS transmission overhead may be significantly decreased in comparison with the case that the CSI-RS is transmitted in every subframe.

The subframe period (hereinafter, referred to as 'CSI-RS transmission period'; T_CSI-RS) for transmitting the CSI-RS and the subframe offset (Δ_CSI-RS) are represented in Table 5 below.

Table 5 exemplifies the configuration of CSI-RS subframe.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

Referring to Table 5, according to the CSI-RS subframe configuration (I_CSI-RS), the CSI-RS transmission period (T_CSI-RS) and the subframe offset (Δ_CSI-RS) are determined.

The CSI-RS subframe configuration in Table 5 is configured as one of the 'SubframeConfig' field and the 'zeroTx-PowerSubframeConfig' field. The CSI-RS subframe configuration may be separately configured for the NZP CSI-RS and the ZP CSI-RS.

The subframe including the CSI-RS satisfies Equation 12 below.

$$(10n_f + \lfloor n_s/2 \rfloor - \Delta_{CSI-RS}) \bmod T_{CSI-RS} = 0 \quad \text{[Equation 12]}$$

In Equation 12, T_CSI-RS represents the CSI-RS transmission period, Δ_CSI-RS represents the subframe offset value, n_f represents the system frame number, and n_s represents the slot number.

In the case of a UE to which transmission mode 9 is set for a serving cell, a single CSI-RS resource may be configured to the UE. In the case of a UE to which transmission mode 10 is set for a serving cell, one or more CSI-RS resources may be configured to the UE.

For each CSI-RS resource configuration, the following parameters may be set through high layer signaling.

In the case that transmission mode 10 is set, the CSI-RS resource configuration identifier The number of CSI-RS ports The CSI-RS configuration (refer to Table 3 and Table 4)

The CSI-RS subframe configuration (I_CSI-RS; refer to Table 5)

In the case that transmission mode 9 is set, the transmission power (P_C) for the CSI feedback In the case that transmission mode 10 is set, the transmission power (P_c) for the CSI feedback with respect to each CSI process. When the CSI subframe sets C_CSI,0 and C_CSI,1 are set by a high layer for the CSI process, P_c is set for each CSI subframe set of the CSI process.

The pseudo-random sequence generator parameter (n_ID)

In the case that transmission mode 10 is set, the QCL scrambling identifier (qcl-ScramblingIdentity-r11) for assuming of the Quasi Co-Located (QCL) type B UE, the CRS port count (crs-PortsCount-r11), and the high layer parameter ('qcl-CRS-Info-r11') that includes the MBSFN subframe configuration list (mbsfn-Subframe-ConfigList-r11) parameter When the CSI feedback value obtained by a UE has the value in the range of [−8, 15] dB, P_c is presumed by the ratio of the PDSCH EPRE for the CSI-RS EPRE. Herein, the PDSCH EPRE corresponds to the symbol in which the ratio of PDSCH EPRE for the CRS EPRE is ρ_A.

In the same subframe of a serving cell, the CSI-RS and the PMCH are not configured together.

When four CRS antenna ports are configured in frame structure type 2, the CSI-RS configuration index belonged to [20-31] set in the case of the normal CP (refer to Table 3) or [16-27] set in the case of the extended CP (refer to Table 4) is not configured to a UE.

A UE may assume that the CSI-RS antenna port of the CSI-RS resource configuration has the QCL relation with the delay spread, the Doppler spread, the Doppler shift, the average gain and the average delay.

The UE to which transmission mode 10 and QCL type B are configured may assume that the antenna ports 0 to 3 corresponding to the CSI-RS resource configuration and the antenna ports 15 to 22 corresponding to the CSI-RS resource configuration have the QCL relation with the Doppler spread and the Doppler shift.

For the UE to which transmission mode 10 is configured, one or more Channel-State Information—Interference Measurement (CSI-IM) resource configuration may be set.

The following parameters may be configured for each CSI-IM resource configuration through high layer signaling.

The ZP CSI-RS configuration (refer to Table 3 and Table 4)

The ZP CSI-RS subframe configuration (I_CSI-RS; refer to Table 5)

The CSI-IM resource configuration is the same as one of the configured ZP CSI-RS resource configuration.

In the same subframe in a serving cell, the CSI-IM resource and the PMCH are not configured simultaneously.

For the UE to which transmission modes 1 to 9 are set, a ZP CSI-RS resource configuration may be configured to the UE for the serving cell. For the UE to which transmission mode 10 is set, one or more ZP CSI-RS resource configurations may be configured to the UE for the serving cell.

The following parameters may be configured for the ZP CSI-RS resource configuration through high layer signaling.

The ZP CSI-RS configuration list (refer to Table 3 and Table 4)

The ZP CSI-RS subframe configuration (I_CSI-RS; refer to Table 5)

In the same subframe in a serving cell, the ZP CSI-RS resource and the PMCH are not configured simultaneously.

Cell Measurement/Measurement Report

For one or several methods among the several methods (handover, random access, cell search, etc.) for guaranteeing the mobility of UE, the UE reports the result of a cell measurement to an eNB (or network).

In the 3GPP LTE/LTE-A system, the cell-specific reference signal (CRS) is transmitted through 0, 4, 7 and 11th OFDM symbols in each subframe on the time axis, and used for the cell measurement basically. That is, a UE performs the cell measurement using the CRS that is received from a serving cell and a neighbor cell, respectively.

The cell measurement is the concept that includes the Radio resource management (RRM) measurement such as the Reference signal receive power (RSRP) that measures the signal strength of the serving cell and the neighbor cell or the signal strength in comparison with total reception power, and so on, the Received signal strength indicator (RSSI), the Reference signal received quality (RSRQ), and the like and the Radio Link Monitoring (RLM) measurement that may evaluate the radio link failure by measuring the link quality from the serving cell.

The RSRP is a linear average of the power distribution of the RE in which the CRS is transmitted in a measurement frequency band. In order to determine the RSRP, CRS (R0) that corresponds to antenna port '0' may be used. In addition, in order to determine the RSRP, CRS (R1) that corresponds to antenna port '1' may be additionally used. The number of REs used in the measurement frequency band and the measurement duration by a UE in order to determine the RSRP may be determined by the UE within the limit that satisfies the corresponding measurement accuracy requirements. In addition, the power per RE may be determined by the energy received in the remaining part of the symbol except the CP.

The RSSI is obtained as the linear average of the total reception power that is detected from all sources including the serving cell and the non-serving cell of the co-channel, the interference from an adjacent channel, the thermal noise, and so on by the corresponding UE in the OFDM symbols including the RS that corresponds to antenna port '0'. When a specific subframe is indicated by high layer signaling for performing the RSRQ measurement, the RSSI is measured through all OFDM symbols in the indicated subframes.

The RSRQ is obtained by N×RSRP/RSSI. Herein, N means the number of RBs of the RS SI measurement bandwidth. In addition, the measurement of the numerator and the denominator in the above numerical expression may be obtained by the same RB set.

An eNB may forward the configuration information for the measurement to a UE through high layer signaling (e.g., RRC Connection Reconfiguration message).

The RRC Connection Reconfiguration message includes a radio resource configuration dedicated ('radioResourceConfigDedicated') Information Element (IE) and the measurement configuration ('measConfig') IE.

The 'measConfig' IE specifies the measurement that should be performed by the UE, and includes the configuration information for the intra-frequency mobility, the inter-frequency mobility, the inter-RAT mobility as well as the configuration of the measurement gap.

Particularly, the 'measConfig' IE includes 'measObjectToRemoveList' that represents the list of the measurement object ('measObject') that is to be removed from the measurement and 'measObjectToAddModList' that represents the list that is going to be newly added or amended. In addition, 'MeasObjectCDMA2000', 'MeasObjctEUTRA', 'MeasObjectGERAN' and so on are included in the 'measObject' according to the communication technique.

The 'RadioResourceConfigDedicated' IE is used to setup/modify/release the Radio Bearer, to change the MAC main configuration, to change the Semi-Persistent Scheduling (SPS) configuration and to change the dedicated physical configuration.

The 'RadioResourceConfigDedicated' IE includes the 'measSubframePattern-Serv' field that indicates the time domain measurement resource restriction pattern for serving cell measurement. In addition, the 'RadioResourceConfigDedicated' IE includes 'measSubframeCellList' indicating the neighbor cell that is going to be measured by the UE and 'measSubframePattern-Neigh' indicating the time domain measurement resource restriction pattern for neighbor cell measurement.

The time domain measurement resource restriction pattern that is configured for the measuring cell (including the serving cell and the neighbor cell) may indicate at least one subframe per radio frame for performing the RSRQ measurement. The RSRQ measurement is performed only for the subframe indicated by the time domain measurement resource restriction pattern that is configured for the measuring cell.

As such, a UE (e.g., 3GPP Rel-10) should measure the RSRQ only in the duration configured by the subframe pattern ('measSubframePattern-Serv') for the serving cell measurement and the subframe pattern ('measSubframePattern-Neigh') for the neighbor cell measurement.

Although the measurement in the pattern for the RSRQ is not limited, but it is preferable to be measured only in the pattern for the accuracy requirement.

Quasi Co-located (QCL) Between Antenna Ports

Quasi co-located or quasi co-location (QC/QCL) may be defined as follows.

When it is described that two antenna ports are in QC/QCL relation (or being QC/QCL), a UE may assume that the large-scale property of a signal transferred through an antenna port may be inferred from a signal transferred through another antenna port. Here, the large-scale property includes one or more of delay spread, Doppler spread, frequency shift, average reception power and reception timing.

In addition, the QC/QCL may also be defined below. When it is described that two antenna ports are in QC/QCL relation (or being QC/QCL), a UE may assume that the large-scale property of a channel in which a symbol is transferred through an antenna port may be inferred from a radio channel in which a symbol is transferred through another antenna port. Here, the large-scale property includes one or more of delay spread, Doppler spread, Doppler shift, average gain and average delay.

That is, the fact that two antenna ports are in QC/QCL relation (or being QC/QCL) means that the large-scale property of a radio channel from an antenna port is the same as the large-scale property of a radio channel from another antenna port. When a plurality of antenna ports through which an RS is transmitted is considered, in the case that the antenna ports through which two types of different RSs are transmitted are in the QCL relation, the large-scale property of a radio channel from a type of antenna port may be replaced by the large-scale property of a radio channel from another type of antenna port.

In the present specification, the above definitions in relation to the QC/QCL are not distinguished. That is, the concept of the QC/QCL may follow one of the definitions. Or, as a similar form, the definition of the QC/QCL concept may be modified to the form that it is assumed that, between the antenna ports in which the QC/QCL assumption is satisfied, a signal is transmitted as if it is transmitted in the same location (e.g., a UE may assume that it is the antenna port that transmits in the same transmission point, and so on), and the inventive concept of the present invention includes such a similar modification examples. For the convenience of description, in the present invention, the definitions in relation to the QC/QCL above are used by being mixed.

According to the QC/QCL concept, a UE may not assume the same large-scale property between the radio channels from the corresponding antenna ports for non-QC/QCL antenna ports. That is, in this case, a UE should perform an independent processing for each of the non-QC/QCL antenna ports configured to each of timing acquisition and tracking, frequency offset estimation and compensation, delay estimation and Doppler estimation, and so on.

Between the antenna ports in which QC/QCL may be assumed, there is an advantage that a UE may perform the following operations.

For the delay spread and the Doppler spread, a UE may identically apply the power-delay profile, the delay spread and the Doppler spectrum and the Doppler spread estimation result for the radio channel from an antenna port to the wiener filter and the like that are used when estimating the channel for the radio channel from another antenna port.

For the frequency shift and the reception timing, after performing the time and frequency synchronization for an antenna port, a UE may apply the same synchronization to demodulation of another antenna port.

For the average reception power, a UE may average the Reference Signal Received Power (RSRP) measurement.

For example, in the case that a DMRS antenna port for the DL data channel demodulation for a UE is being QC/QCL with the CRS antenna port of a serving cell, when estimating a channel through the corresponding DMRS antenna, the UE may identically apply the large-scale properties of the radio channel estimated from its own CRS antenna port, thereby the reception performance of the DMRS-based DL data channel being improved.

This is because the CRS is a reference signal broadcasted with relatively high density throughout the entire band, and the estimation value of the large-scale property is obtainable from the CRS more stably. On the contrary, the DMRS is transmitted in a UE-specific manner for a specific scheduled RB. In addition, since the precoding matrix in which a unit of precoding resource block group (PRG) is used for a transmission by an eNB is changeable, the valid channel received in a UE may be changed in a unit of RPG. Accordingly, even in the case that a UE is scheduled with a plurality of PRGs, the performance degradation may occur when the DMRS is used for estimating the large-scale property of a radio channel throughout wide band. In addition, since a transmission period of a CSI-RS may be a few to dozens of nm and may have low density of 1 resource element per antenna port for each resource block, the performance degradation may also occur when the CSI-RS is used for estimating the large-scale property of a radio channel.

That is, a UE may utilize the QC/QCL assumption between antenna ports for detecting/receiving a DL reference signal, channel estimation, channel state report, and so on.

Massive MIMO

In wireless communication systems following LTE Rel-12, the introduction of an active antenna system (AAS) is considered.

The AAS refers to a system in which each antenna includes an active element such as an amplifier, differently from a conventional passive antenna system in which an amplifier capable of adjusting the phase and magnitude of a signal is separated from an antenna.

The AAS is efficient in terms of energy and maintenance costs since an additional cable, connector, hardware, etc. for connecting an amplifier to an antenna for active antenna configuration are not needed. Particularly, the AAS enables enhanced MIMO, such as the formation of an accurate beam pattern in consideration of the beam direction and the beam width and the formation of a three-dimensional (3D) beam pattern, because the AAS supports electronic beam control per antenna.

With the introduction of an enhanced antenna system such as the AAS, large-scale MIMO having a plurality of input/output antennas and a multi-dimensional antenna structure is considered. For example, when a two-dimensional (2D) antenna array rather than a conventional linear antenna structure is formed, a 3D beam pattern may be formed according to the active antennas of AAS. When the 3D beam pattern is used for the transmission antennas, quasi-static or dynamic beam pattern formation in the vertical direction as well as in the horizontal direction may be performed and the sector formation in the vertical direction, for example, may be considered.

In addition, in terms of the reception antenna, the signal power increase according to antenna array gain may be expected when a reception beam is formed using a reception antenna. Accordingly, an eNB may receive signals transmitted from UEs through a plurality of antennas on uplink. Here, the UEs may set transmission power thereof to a very low value in consideration of the gain of reception antennas to reduce the influence of interference.

FIG. 11 illustrates a system in which an eNB or a UE has a plurality of transmission/reception antennas capable of the AAS based 3D beam formation.

FIG. 11 illustrates a 3D MIMO system using a two-dimensional antenna array (i.e., a 2D-AAS) as a diagram of the previous description.

Cell Coverage of Massive MIMO

A MIMO system, for example, a system including N transmission antennas may perform beamforming to increase reception power to up to N times that of a single-antenna system at a specific point even if transmission is carried out with the same transmission power in the MIMO system and single-antenna system.

Even in an eNB having a plurality of antennas, beamforming in a specific direction is not performed in order to enable all UEs in the coverage of the eNB to receive channels on which a CRS, PSS/SSS, PBCH and broadcast information are transmitted.

Unlike this, the eNB increases transmission efficiency by performing beamforming on a PDSCH on which unicast information is transmitted to a specific UE according to the position of the UE and link state. That is, transmission data streams of the PDSCH are precoded to form a beam in a specific direction and transmitted through a plurality of antenna ports. Accordingly, when the transmission power of a CRS is equal to the transmission power of the PDSCH, the reception power of the precoded PDSCH beamformed to the specific UE may be up to N times the average reception power of the CRS.

Up to now, the eNB that has maximum of 8 transmission antennas has been considered in LTE Rel-11, which means precoded PDSCH reception power may be eight times greater than the CRS average reception power. However, when the eNB has 100 or more transmission antennas due to the introduction of a large-scale MIMO system, the precoded PDSCH may have the reception power more than 100 times the CRS reception power. Consequently, the coverage of a CRS transmitted by a specific eNB may not correspond to the coverage of a DM-RS based PDSCH owing to the introduction of the large-scale MIMO system.

Especially, this phenomenon may be magnified when a difference between the numbers of transmission antennas of neighboring eNBs is large. For example, when a macro cell having 64 transmission antennas and a micro cell (e.g., a pico cell) having a single transmission antenna are located adjacent to each other. Since a macro cell that serves many UEs is expected to increase the number of antennas during the initial deployment of large-scale MIMO, there is a large difference between the numbers of transmission antennas of neighboring eNBs in a heterogeneous network including a macro cell, a micro cell and a pico cell.

For example, a CRS coverage corresponds to a PDSCH coverage in the case of a pico cell having a single transmission antenna. In the case of a macro cell having 64 transmission antennas, however, the CRS coverage is larger than the PDSCH coverage. Therefore, an eNB providing highest quality of PDSCH may not be selected as a serving cell when the initial access and handover are selected depending only on the reception quality of CRS, that is, reference signal received power (RSRP) or reference signal received quality (RSRQ), at the boundary of the macro cell and the pico cell. A simple solution to this problem is to assume that PDSCH reception power of an eNB having N transmission antennas may be N times bigger than a single transmission antenna, however, this solution is not ideal when a case in which the eNB cannot perform beamforming in every direction is considered.

RRM-RS

The present invention proposes a method for transmitting a precoded RS and measuring radio resource management (RRM) for the same. In the following description, the precoded RS is referred to as an RRM-RS. The RRM-RS is configured for a plurality of antenna ports and beamforming is set differently for the antenna ports such that a UE can measure the RSRP per transmission beam. For example, when an eNB is capable of beamforming in M directions, the RRM-RS is configured for M antenna ports.

Period and Multiplexing of RRM-RS

The M-port RRM-RS may be code-division-multiplexed (CDM) or frequency/time-division-multiplexed (FDM/TDM) in the same subframe and transmitted. That is, the transmission signals for each antenna port of the M port RRM-RS may be transmitted using different transport REs in the same subframe or may be discriminated from one another without interference using orthogonal scrambling codes for the ports when transmitted using the same RE.

Unlike this, the number of antenna ports capable of simultaneously transmitting the RRM-RS through one subframe may be set to K and the RRM-RS may be distributed to M/K subframes and transmitted.

In this case, the configuration parameters with respect to the RRM-RS may include the total number of ports, M, and the number of ports for simultaneous transmission through one subframe, K. The RRM-RS configuration parameters may include the RRM-RS transmission period P and offset O. Here, the RRM-RS transmission period is defined as an interval between subframes in which the RRM-RS is transmitted. For example, when P=10, O=5, M=64 and K=32, the RRM-RS is transmitted in subframes with subframe indices (SFI) of 5, 15, 25, 35, . . . . Specifically, the RRM-RS is transmitted in such a manner that the RRM-RS corresponding to the RRM-RS antenna ports #0 to #31 is transmitted in subframe with SFI=5, the RRM-RS corresponding to the RRM-RS antenna ports #32 to #63 is transmitted in subframe with SFI=15, and the RRM-RS corresponding to the RRM-RS antenna ports #0 to #31 is transmitted again in subframe with SFI=25.

Alternatively, the RRM-RS transmission period is defined as a subframe interval at which an RS corresponding to the same antenna port is transmitted. In a method for transmitting the RRM-RS antenna ports distributed to (M/K) subframes, the ports may be transmitted. For example, P=20, O=5, M=64 and K=32, the RRM-RS is transmitted in subframes with SFIs of 5, 6, 25, 26, 45, 46, . . . . Specifically, the RRM-RS is transmitted in such a manner that the RRM-RS corresponding to the RRM-RS antenna ports #0 to #31 is transmitted in a subframe with SFI=5, the RRM-RS corresponding to the RRM-RS antenna ports #32 to #63 is transmitted in a subframe with SFI=6 and the RRM-RS corresponding to the RRM-RS antenna ports #0 to #31 is transmitted again in subframe with SFI=25.

RSRP Measurement and Reporting

The RSRP of RRM-RS is measured and reported per port. A plurality of RRM-RSs may be configured for a UE.

When one RRM-RS is transmitted per cell, the RRM-RSs transmitted by a serving cell and a neighboring cell may be configured for the UE. One cell may transmit a plurality of RRM-RSs. When the UE reports the RSRP of RRM-RS, the UE may report that the RSRP is the RSRP measurement result of what the antennal port and of what RRM-RS.

To calculate the RSRP of RRM-RS, the UE averages the reception signal levels of antenna ports. Here, a time window for averaging may be predetermined by an eNB or may correspond to a predetermined time (e.g. 200 ms). The UE may acquire RSRP by averaging the reception signal levels of RRM-RSs for antenna ports for the duration of the time window. Otherwise, the UE may obtain the RSRP to be reported by filtering average the reception power acquired for the time window.

The UE for which a plurality of RRM-RSs is configured may measure the RSRP per antenna port of each RRM-RS. When R RRM-RSs are configured and the number of antenna ports for an $r^{th}$ RRM-RS is M_r, RSRP corresponding to an $m^{th}$ antenna port with respect to the $r^{th}$ RRM-RS is defined as RSRP(r, m). The UE may align the RSRP(r, m), select the RSRP of L antenna ports through which signals are received with high power and report the selected RSRP.

In a modified scheme, the UE may align the RSRP(r, m), select an antenna port through which a signal is received with maximum power and report only the RSRPs of ports, which have predetermined differences from the RSRP of the selected antenna port, i.e., max(RSRP(r, m)). That is, the UE reports the RSRPs of a maximum of L antenna ports, which have differences more than a predetermined threshold from the RSRP ratio or dB scale as represented by the following.

$$RSRP(r,m)-\max(RSRP(r,m))>\text{Threshold} \quad [\text{Equation 13}]$$

For another example, the UE may be assigned a reference antenna port. As the reference antenna port, it is preferable to designate the antenna port of RRM-RS, which is transmitted by a serving cell that has a similar beam direction with the precoded CSI-RS configured for the corresponding UE. When the UE is assigned an $(m-0)^{th}$ antenna port corresponding to an $(r-0)^{th}$ RRM-RS as the reference antenna port, the UE reports the RSRPs of other antenna ports when the RSRPs of the other antenna ports have a predetermined difference from the RSRP of the reference antenna port. That is, the UE reports the RSRPs when RSRP differences exceed a predetermined threshold as follows.

$$RSRP(r,m)-RSRP(r\_0,m\_0)>\text{Threshold} \quad [\text{Equation 14}]$$

FIG. 12 illustrates the RSRP for the antenna port of the RRM-RS according to an embodiment of the present invention.

FIG. 12 illustrates the RSRP of 32-port RRM-RS per antenna port.

When the RSRPs of antenna ports, which have differences of 5 dB or less from maximum RSRP, are reported, the RSRPs of 35 dB or higher are reported since antenna port 13 has maximum 40 dB RSRP in FIG. 12. That is, the RSRPs of antenna ports 24, 25 and 26 including antenna port 13 are reported to an eNB.

Antenna Port Grouping

The present invention sets beamforming differently per antenna port such that antenna ports respectively correspond to beams.

Accordingly, antenna port index i can be mapped to beam index i. When beams are indexed such that the directions of an $i^{th}$ beam and $(i+1)^{th}$ beam are adjacent to each other, the RSRPs of neighboring antenna ports have similar features to each other, as illustrated in FIG. 12. While similarity is present between the $i^{th}$ beam and $(i+c)^{th}$ beam, however, similarity decreases as c increases. The number of consecutive beams having high similarity may be determined based on beam spacing, beam width and scattering degree of multiple paths.

When the UE reports an RRM-RS based RSRP measurement result to the eNB, the eNB may detect the approximate position of the UE and signal configuration of a precoded CSI-RS transmitted to the position to the UE such that the UE can measure the CSI-RS and feedback CSI (RI, PMI, CQI, etc.) for the PDSCH scheduling. In addition, upon the reception of the reports on the RSRP measurement results based on the RRM-RSs transmitted from a plurality of cells, the eNB may determine a target cell to which the corresponding UE will be handed over and a precoded CSI-RS to be configured for the UE in the target cell on the basis of the RSRP measurement results. That is, the RRM-RS based RSRP measurement results provide important information necessary to determine a precoded CSI-RS to be configured for the corresponding UE.

When a 4-port CSI-RS is configured in order to enable the corresponding UE to transmit a maximum of 4 data streams or to perform optimal beam switching according to fading variation on the basis of the RSRP measurement result of FIG. 12, a 4-port CSI-RS in the same direction as beam directions of RRM-RS ports 13, 24, 25 and 26 having high RSRP configured as an optimal CSI-RS. However, the optimization and generation of a CSI-RS per UE causes excessively high overhead. Accordingly, many UEs in the same environment share a CSI-RS in order to reduce the CSI-RS transmission overhead. To achieve this, the CSI-RS antenna ports in one CSI-RS configuration need to be precoded to represent characteristics of a beam transmitted in a neighboring direction. That is, when 4-port CSI-RS1 in the same directions as beam directions of RRM-RS ports 12, 13, 14 and 15 and 4-port CSI-RS2 in the same directions as beam directions of RRM-RS ports 24, 25, 26 and 27 are preset in consideration of other UEs, it is necessary to determine a CSI-RS most suitable for the corresponding UE through the report of the RSRP of RRM-RS.

The present invention additionally proposes a method for measuring and reporting the RSRP for an antenna port group. A UE may average the RSRPs of antenna ports belonging to a plurality of groups to acquire the RSRP of a corresponding antenna port group. The group may be predetermined or determined and signaled by the eNB. Otherwise, the UE may determine an antenna port grouping scheme and signal the same.

In the case of 32-port RRM-RS as shown in FIG. 12, 4 antenna ports may be grouped as one group. The 32 antenna ports may be grouped into 8 (32/4) groups disjointly. In this case, an $i^{th}$ antenna port group consists of RRM-RS ports 4i, 4i+1, 4i+2 and 4i+3. The RSRP of the $i^{th}$ antenna port group is defined as the average of RSRPs of antenna ports 4i, 4i+1, 4i+2 and 4i+3.

As another example, antenna ports may be grouped by being allowed to be overlapped between groups. When four of 32 RRM-RS ports are grouped into one group, the 32 RRM-RS ports are grouped into 15 groups. In this case, the $i^{th}$ antenna port group consists of RRM-RS ports 2i, 2i+1, 2i+2 and 2i+3. When the proposed scheme is normalized to group A antenna ports as one group and to set an interval between neighboring antenna port groups to B, the $i^{th}$ antenna port group is composed of RRM-RS ports B*i, (B*i+1), ..., (B*i+A−1). Parameters A and B are set by the eNB for the UE or selected and reported by the UE in consideration of channel environment and UE capability In a modification of the proposed scheme, the UE may select an antenna port group to be reported in consideration of capacity that can be obtained with the corresponding antenna port group rather than the RSRP. In this case, the UE calculates the capacity in consideration of the multi-layer data transmission from a plurality of antenna ports in the antenna port group.

Antenna Port Grouping Level

In the proposed scheme, a method of grouping antenna ports in sizes may be used. That is, a method of grouping A1 antenna ports as one group and a method of grouping A2 antenna ports as one group may be simultaneously used. Here, a method of grouping A_i antenna ports as one group is referred to as antenna grouping level i.

FIG. 13 illustrates an example of the RRM-RS antenna port grouping level according to an embodiment of the present invention.

FIG. 13 illustrates an example of a method of grouping 16 RRM-RS antenna ports using 4 grouping levels. In the example, grouping level 1 refers to a method of grouping one antenna port as one group, which does not form an antenna group. Grouping levels 2, 3 and 4 respectively refer to methods of grouping 2 antenna ports, 4 antenna ports and 8 antenna ports as one group. In the example of a drawing, the antenna port groups of the same level are disjointly set.

In this multiple grouping method, the UE reports RSRP per grouping level. That is, the UE may select an antenna port group with high RSRP per grouping level and report the selected antenna port group. Otherwise, the UE may compare the RSRPs of antenna port groups of different levels and report the information (i.e. antenna grouping level, antenna group index, etc.) on the best group and the group level. To compare the RSRPs of antenna port groups of different antenna grouping levels, a predetermined offset may be applied to the RSRP of the antenna port group of each level. When R RRM-RSs are configured and the RSRP of a $g^{th}$ antenna port group of the $l^{th}$ grouping level of the $r^{th}$ RRM-RS is defined as GRSRP(r, l, g), offset(r, l) designated by the eNB for the $l^{th}$ grouping level of the $r^{th}$ RRM-RS is applied to GRSPR(r, l, g) to calculate Adj_GRSRP(r, l, g) and compare the same as follows.

$$\text{Adj\_GRSRP}(r,l,g) = \text{GRSRP}(r,l,g) + \text{offset}(r,l) \quad \text{[Equation 15]}$$

In addition, the RSRP may be corrected by adding a hysteresis parameter (Hy) per antenna grouping level or in order to reduce frequent changes in the RSRP of the best L antenna port groups in the all grouping method.

$$\text{Adj\_GRSRP}(r,l,g) = \text{GRSRP}(r,l,g) + \text{offset}(r,l) \pm Hy \quad \text{[Equation 16]}$$

Here, addition or subtraction of Hy is determined depending on whether a corresponding antenna port group is included in the best L GRSRP in a previous report. When the corresponding port group is included in the best L GRSRP in the previous report, Hy may be added to RSRP of the corresponding antenna group such that the corresponding antenna port has high Adj_RSRP so as to prevent the port groups having the best L Adj_GRSRP from being frequently changed.

As a proposed scheme, the UE may be assigned a reference antenna port group. In is preferable that the eNB designates an antenna port group corresponding to an RRM-RS transmitted by the serving cell, which has the same beam direction as that of a precoded CSI-RS configured for the UE, as the reference antenna port group. The UE may be assigned a reference antenna port group per antenna grouping level. Otherwise, the UE may be assigned one reference antenna port group for all grouping levels. When an $(m-0)^{th}$ antenna port group of an $(I-0)^{th}$ grouping level of an $(r-0)^{th}$ RRM-RS is designated as the reference antenna group for the UE, the UE reports the Adj_GRSRPs of other antenna port groups when a difference between the Adj_GRSRPs of the other antenna port groups and the Adj_GRSRP of the reference port group exceeds a predetermined threshold. That is, the UE may report the RSRP when the RSRP difference exceeds the predetermined threshold in the equation of the Adj_GRSRP ratio or dB scale as the following.

$$\text{Adj\_GRSRP}(r,l,g) - \text{Adj\_GRSRP}(r\_0,l\_0,m\_0) > \text{Threshold} \qquad [\text{Equation 17}]$$

In a modification of the proposed method, a reference RSRP is specified through the currently configured CSI-RS such that the UE compares RRM-RS based RSRP with CSI-RS based RSRP, selects the RSRP and reports the same.

RRM-RS for 3-Dimension (3D)

The aforementioned proposed method may be modified and applied when beam directivity is extended from 2D space to 3D space. The Beam directivity in the 3D space is adjusted by two angles, a vertical angle and a horizontal angle. Accordingly, it is efficient to index beams with two indexes, that is, a horizontal index and a vertical index in order to check whether the beams are neighboring beams. The RRM-RS ports need to be indexed with a horizontal index and a vertical index to one-to-one match beam indexes to RRM-RS port indexes according to characteristics of the present invention.

In the case of a 3D MIMO system having M_v beams in the vertical direction and M_h beams in the horizontal direction, (M_v×M_h) beams are available. The present invention sets (M_v×M_h)-port RRM-RS and provides horizontal indexes j_h (j_h=0, . . . , M_h−1) and vertical indexes j_v (j_v=0, . . . , M_v−1) to the respective antenna ports. Each antenna port is given 1D index i (i=0, . . . , M_v×M_h−1) and 2D index j_h and j_v in consideration of the resource mapping of the (M_v×M_h)-port RRM-RS. Here, (i)=f(j_h, j_v).

FIG. 14 is a diagram illustrating an antenna port of the RRM-RS arranged with 2D index and the antenna port group according to an embodiment of the present invention.

Referring to FIG. 14, each antenna port is indexed with (j_h, j_v). When A_h×A_v ports are grouped as one group according to the proposed method and port intervals between neighboring groups are respectively set to B_h and B_v, the (i_h, i_v)$^{th}$ antenna port group consists of RRM-RS port (B_h×i_h+j_h, B_v×i_v+j_v), (j_h=0, . . . , A_h−1), (j_v=0, . . . , A_v−1). Parameters A_h, A_v, B_h and B_v may be designated by the eNB for the UE or selected and reported by the UE in consideration of channel environment and UE capabilities.

Difference Between RRM-RS and CSI-RS

In the existing LTE/LTE-A system, a CSI-RS is transmitted to report CSI. The UE reports an RI, PMI, CQI, etc. as CSI. Meanwhile the RRM-RS proposed by the present invention is used to measure the RSRP per antenna port. Accordingly, it is desirable to use resources that can be configured by the existing CSI-RS rather than newly defining resources for transmission of the RRM-RS to prevent transmission efficiency of legacy UEs from decreasing. Since the legacy UEs do not recognize the RRM-RS when the RRM-RS is transmitted through a new resource, the transmission efficiency is deteriorated or scheduling cannot be performed in a subframe in which the RRM-RS transmitted. Accordingly, the method for transmitting the RRM-RS using a resource that can be configured by the existing CSI-RS, may inform the legacy UEs that data is not mapped to the resource by configuring the CSI-RS including the corresponding resource.

Data is not mapped to a plurality of CSI-RSs configured for a UE for the CSI report. That is, a PDSCH is mapped to an RE other than an RE to which the CSI-RS is mapped. In a method proposed by the present invention, a PDSCH may be mapped to an RE other than an RE to which the RRM-RS is mapped. However, the PDSCH may be mapped irrespective of the RRM-RS in a modified method. In this case, the UE needs to be able to simultaneously receive the RRM-RS and the PDSCH through the same RE. Otherwise, the eNB may set a corresponding resource as a ZP-CSI-RS in order to secure safe reception of RRM-RS such that the PDSCH is not mapped to the resource.

OCL Configuration of RRM-RS

When each cell transmits the RRM-RS, the UE may be assigned the configuration of RRM-RSs transmitted from the serving cell and neighboring cells. Through this, the UE measures gain according to beamforming of the serving cell and gain of beamforming of the neighboring cell and reports the measured gains to a network such that the gains are used as the basis of determination of handover. The RRM-RS may not be suitable for signal tracking since the transmission density of RRM-RS is set to a very low value. Accordingly, a CRS is tracked as a representative of signals received with high density and high reliability and the CRS tracking result is used to detect the RRM-RS. That is, since the CRS tracking result of the serving cell is not suited to use for the RRM-RS transmitted from a neighboring cell due to an error of the oscillator that generates carrier frequencies of the serving cell and the neighboring cell. Therefore, a quasi co-located (QCL) CRS (or specific RS such as a CSI-RS) to be used to detect the RRM-RS is signaled per each RRM-RS. The UE uses large-scale characteristics of a channel estimated from the QCL CRS (or specific RS such as CSI-RS) for the RRM-RS detection. Here, the large-scale characteristics of the channel may include at least one or more of delay spread, Doppler spread, Doppler shift, average gain and average delay.

Extension to RSRQ

The aforementioned proposed methods may be extended and applied to a method of measuring the RSRQ per antenna port. The RSRQ is defined as the ratio of RSRP and RSSI. Accordingly, the measurement of the RSSI is added. The RSSI measurement resource may be set for all RRM-RSs having the same carrier frequency, that is, all RRM-RSs configured for the same component carrier. In this case, comparison of ports of RRM-RSs in the same component carrier is performed in the same manner irrespective of using RSRP or RSRQ. However, the comparison of ports of RRM-RSs in different component carriers depends on whether RSRP or RSRQ is used. Accordingly, the eNB designates one of the RSRP and RSRQ for the UE when the UE performs RRM-RS based RRM reporting.

Alternatively, the eNB may separately set an RSSI measurement resource per RRM-RS. In this case, the comparison of ports of RRM-RSs depends on whether RSRP or RSRQ is used even in the same component carrier. Accordingly, the eNB may determine whether the UE uses RSRP or RSRQ to perform RRM-RS based RRM reporting.

Correlation Between RRM-RS RSRP and CRS RSRP

RRM-RS based RSRP according to the present invention is used to apply beamforming gain of an eNB having a plurality of antennas to selection of a serving cell. Even when it is determined that a specific neighboring cell has performed beamforming with highest quality, on the basis of RSRP of RRM-RS, if channels broadcast by the corresponding cell, that is, CRS-based demodulated channels are stably received, then a UE cannot be handed over to the neighboring cell. Accordingly, the eNB needs to receive a report on whether both the RRM-RS and CRS transmitted from a specific eNB have high quality from the UE, determine handover and select a beam on the basis of the report. To achieve this, the UE reports the RSRP of CRS related to an $i^{th}$ RRM-RS configured therefore while reporting the RSRP of a $j^{th}$ antenna port or antenna port group of the $i^{th}$ RRM-RS. Here, the CRS related to the RRM-RS may be a QCL CRS for the RRM-RS.

RRM-RS-based Cell Selection Method

The method described above may be a method for assisting a UE association determination by a UE to report RRM measurement values (e.g., RSRP, RSRQ, etc.) to an eNB based on beamformed RS ports in a specific direction or different RS ports in the amorphous cell environment (including the number of different TP(s)/cell(s)) like the RRM-RS described above.

Here, the amorphous cell means a cell constructed amorphously with a UE as the center, does not have a fixed cell shape. That is, the amorphous cell forms coverage by sending data to a mobile UE through the cooperation between congested (small) cells without a fixed cell shape. Accordingly, when a UE moves, the cell of the moved location is considered, thereby the handover being minimized.

That is, in order for a UE to perform such a series of operations, a UE should access to a specific cell through an initial access procedure such as the existing random access procedure (i.e., Random Access Channel procedure (RACH)) first, and the UE should be provided with various types of advance information such as the RRM-RS related configuration information by the RRC signaling in the RRC-connected state. Later, the UE performs the operation of reporting various RRM measurement values to an eNB through the various RRM report procedure described above. And then, the best cell selection/handover procedures is performed/determined by the eNB, and it may be operated that the corresponding UE is handed-over when it is required, or the best transmission point (TP) is determined and reflected to the CSI-RS configuration, and so on. Consequently, in the case that it is confirmed that the best serving cell of the UE is not the serving cell accessed through the initial access procedure through the series of procedure, the handover may occur inevitably. Accordingly, for the UE handed-over to other cell initially through such a procedure as soon as the UE accesses to a cell initially, there is a restriction that unnecessary significant latency occurs for the best cell association.

As another example of the restriction in utilizing the conventional technique, by utilizing the discovery procedure according to the small-cell enhancement of release (Rel)-12, for example, an RS (e.g., a discovery signal, a discovery reference signal (DRS) or a DRS-CSI-RS; hereinafter, referred to as a DRS for the convenience of description) that plays the role of the RRM-RS is configured, and the DRS-based measurement related all sorts of information including a DRS measurement timing configuration (DMTC) may be configured. And, through this, there is a method that may be utilized for the full-dimension MIMO (FD-MIMO) use case or the best UE-centric cell selection in the advanced amorphous cell environment.

The DMTC may be provided to a UE through a higher layer message (e.g., RRC message). The DMTC may include a DRS transmission period/offset, a measurement frequency band, a measurement duration (i.e., discovery signal occasion), DRS antenna port information, and the like.

More specifically, the small-cell enhancement supports the small cell on/off mechanism that on-state of a small cell is maintained only in the case that a UE is existed in the small cell coverage, otherwise, off-state of the small cell is maintained in order to save the small cell energy and decrease the interference on a neighboring cell. In this case, a discovery procedure is required for a small cell of a UE to determine the on/off-state. For this, regardless of the on/off-state, a small cell transmits (i.e., broadcasts) a DRS continuously. That is, even in the case that a small cell is in off-state, the small cell transmits a DRS with a predetermined period. The predetermined period may be referred to as a measurement period or a DRS measurement timing configuration (DMTC), and may correspond to 40 ms, 80 ms, 160 ms, and the like.

In this case, the small cell may maintain the on-state for broadcasting a DRS for a predetermined time (e.g., 1 to 5 subframes). For example, when the measurement period is 40 ms, the small cell may broadcast a DRS while maintaining the on-state for 6 ms, and may maintain the off-state for the remaining 34 ms. Such duration for transmitting a DRS may be referred to as a measurement window or a discovery signal (DRS) occasion. That is, the DRS occasion may include consecutive subframe duration (e.g., 1 (or 2) to 5 consecutive subframe duration), and a DRS occasion may be existed once in every measurement period (or DMTC period).

A UE performs a measurement based on the received DRS from the small cell, and transmits a measurement report to an eNB (or network). As such, by making a UE measure a DRS transmitted from a small cell continuously regardless of whether the small cell is on/off-state and report it to an eNB (or a network), the eNB may detect the small cell of the best efficiency around the corresponding UE. For example, when an eNB (or network) receives the report of the measurement result from a UE, in the case that a DRS reception power from the UE is great even though the small cell is in off-state, the eNB may switch the corresponding small cell to on state.

However, in this case, first, after a UE attaches a specific serving cell in the conventional technique, and after the UE receives configuration information related to a small cell discovery like a DMTC or the like in the RRC-connected state, the UE should perform a plurality of CSI-RS-RSRP reports (i.e., DRS-based RSRP report) for (precoded) DRSs (each is targeted to a separate FD-MIMO beam direction or transmitted from TPs that construct different amorphous cell). When there is a separate best cell in the aspect of an FD-MIMO or an amorphous cell, not the best in the aspect of the CRS-based RSRP, an eNB should handover the UE to the corresponding cell. Consequently, this method also has a restriction that the latency is significantly increased until the UE is associated with the best cell (e.g., since there is a UE that should perform all of the procedures: RRC-connection→Receiving DMTC-related RRC information→long-term DRS-CSI-RS measurement and report→handover).

Accordingly, the present invention proposes a method for a UE to perform a specific RRM measurement (e.g., RSRP, RSRQ, etc.) using a separate RS (e.g., RS for an RRM measurement or RS for cell selection/reselection) different from the existing RS (e.g., CRS) transmitted in a cell-specific manner like the FD-MIMO or amorphous cell environment and/or a method for a UE to select or reselect the best cell by considering an optimal transmission mode that is going to receive by the UE itself even in the RRC idle mode (e.g., RRC_IDLE) state in an initial access, and the like based on the RRM measurement values and/or a method for performing an initial access to the selected best cell. In addition, by performing the method proposed in the present invention, a UE may perform an initial access procedure.

Hereinafter, in describing the present invention, the RRM-RS is commonly referred to as the RS transmitted in different direction locally through a sharp beam like the FD-MIMO as described above, the RS transmitted through different antenna ports for each TP (or cell) disposed in geographically distributed manner, and other RS for separate RRM measurement and report different from a cell-specific reference signal (CRS) (e.g., CSI-RS, DRS, etc.).

1. Initial Cell Search Procedure of a UE

As the first procedure of the initial access procedure according to the present invention, an initial cell search process of a UE may be performed.

In the initial cell search process of a UE, by detecting a specific synchronization signal such as a Primary Synchronization Signal (PSS) and a Secondary Synchronization Signal (SSS) transmitted by each cell in the same way of the conventional method, the UE may obtain a physical (layer) cell-ID (PCI) used by the corresponding cell.

A UE may obtain a PCI using a specific sequence of the PSS and the SSS. That is, an SS may represent total 504 distinctive PCIs through the combination of 3 PSSs and 168 SSSs.

In other words, the PCIs are grouped into 168 PCI groups including 3 distinctive identifiers by each group such that each PCI is a part of only one PCI group. Accordingly, the physical layer cell identifier $N\_ID^{cell}=3N\_ID^{(1)}+N\_ID^{(2)}$ is distinctively defined by the number $N\_ID^{(1)}$ in the range of 0 to 167 that represents a PCI group and the number $N\_ID^{(2)}$ from 0 to 2 that represents the PCI in the PCI group.

A UE becomes to know one of 3 distinctive PCIs in a specific PCI group by detecting a PSS, and a UE may distinguish one of 168 PCI groups related to the PCI by detecting an SSS.

And, by using the detected PCI, and trying to detect a CRS of the corresponding cell transmitted, a UE may perform the verification of a cell-ID.

2. Procedure of Obtaining System Information in a Searched Cell

By reading, for example, a Physical Broadcast Channel (PBCH), a Physical Downlink Shared Channel (PDSCH), and the like transmitted by a cell, a UE obtains various types of system information transferred on the corresponding channel.

The system information may be divided into a Master Information Block (MIB) and a plurality of System Information Blocks (SIB). Hereinafter, the SIB type x (SystemInformationBlockTypex) is simply referred to as 'SIB x'.

A UE uses the procedure for obtaining the system information in order to obtain the system information which is broadcasted by a network. The procedure for obtaining the system information is applied to both of a UE in the RRC_IDLE mode and a UE in the RRC_CONNECTED mode. For example, a UE may initiate the procedure for obtaining the system information when performing a cell selection (e.g., when a power of the UE is turned on) and a cell reselection, after completing the handover, when entering different Radio Access Technology (RAT), when entering into coverage from an exterior the coverage, when receiving a notification that the system information is changed, when a maximum validity duration is lapsed, and so on.

First, a UE receives an MIB from a network. In this case, the MIB is transmitted in the physical channel, PBCH. The MIB is scheduled in subframe #0 of a radio frame of which System Frame Number (SFN) mod 4=0, and repeated in subframe #0 of all other radio frames in the corresponding period. And, the MIB occupies 72 subcarriers in the center of first 4 OFDM symbol of the second slot of subframe #0 in a radio frame.

The UE receives SIB 1 from the network using the parameter received from the MIB. And, the UE receives SIB x except SIB 1 from the network based on the scheduling information list schedulingInfoList obtained from SIB 1.

SIB 1 is scheduled in subframe #5 of a radio frame of which SFN mod 8=0, and repeated in subframe #5 of all other radio frames of which SFN mod 2=0 in 80 ms period. On the contrary, the remaining SIBs except SIB 1 is transmitted with being mapped to the system information (SI) for each SIB that has the same transmission period.

All SIBs is delivered in the physical channel, PDSCH. The PDCCH for an SIB delivers a DCI to which a scrambled CRC is attached by the system information-RNTI (SI-RNTI), and the PDSCH delivering an SIB is distinguished from the PDCCH.

A UE may obtain a particular time/frequency resource region scheduling and so on of the PDSCH that delivers an SI message by decoding the SI-RNTI on the PDCCH. One SI-RNTI is used for addressing all SI messages as well as SIB 1.

The UE may overwrite the system information obtained through the procedure for obtaining the system information on the system information which is previously stored.

Hereinafter, the present invention proposes a method for transmitting the system information such as an MIB, a specific SIB x, or the like with at least one of the following RRM-RS configuration related information being included to a UE. This will be described with reference to drawings below.

FIG. 15 is a diagram illustrating an RRM-RS-based cell selection method according to an embodiment of the present invention.

Referring to FIG. 15, an eNB transmits the system information including RRM-RS configuration information to a UE (step, S1501).

As described above, the RRM-RS below is just a term given for the convenience of description, but may be defined as various terms/modified forms that may be configured as the same or similar format such as a CSI-RS and so on.

RRM-RS configurations with PCI (and/or a neighbor cell list)

The RRM-RS configuration information transmitted from neighbor cells as well as the RRM-RS configuration information transmitted from the corresponding cell together may be provided with a UE as the system information. That is, a specific RRM-RS configuration(s) is linked (or corresponded) to a specific PCI, and the linkage information may be provided together. In this case, one or more RRM-RS may be linked (or corresponded) to a PCI.

Here, a neighbor cell list includes the PCI list of a neighbor cell. For example, the neighbor cell may be targeted to the cells belonged to an eNB site that is existed in an area about 1-tier around the corresponding cell.

Through such RRM-RS configuration information, a UE may obtain the information of the RRM-RS antenna port transmitted from neighbor cells as well as the RRM-RS antenna port transmitted from the corresponding cell by reading the system information. Accordingly, the RRM-RS configuration information may be helpful in the procedure of finding the best RRM measurement value including the neighbor cells.

The configuration information is provided, which is required for a UE to measure the corresponding RRM-RS such as RRM-RS antenna port number information per RRM-RS configuration, RRM-RS antenna port mapping information, the information related to the corresponding RRM-RS transmission period/offset and/or transmission (frequency/time) resource related information, and so on.

That is, as described above, one or more RRM-RS configurations per a PCI (i.e., cell) may be linked (or corresponded), and the configuration information required for measuring the corresponding RRM-RS per an RRM-RS configuration is provided.

In the case that such an RRM-RS is constructed as the form of reusing a DRS (or DRS-CSI-RS) in a small cell discovery, the configuration information required for measuring a CSI-RS as a DRS like a DMTC may be delivered with being included in the corresponding system information.

As the form described above, the configuration information related to the corresponding RRM-RS may be explicitly signaled. However, it is also available that a part of the configuration information related to the RRM-RS described above may be implicitly provided in the form of an implicit indication linked with the corresponding PCI which is detected in the "1. An initial cell search procedure of a UE" described above. That is, the system information may not include a PCI as the configuration information related to the RRM-RS, a UE may determine (or regard) the RRM-RS configuration information included in the system information to be the RRM-RS configuration information liked (or corresponded) with the PCI detected in the initial cell search procedure.

For example, a specific reference resource position of the transmission (frequency/time) resource related information may be fixedly predefined according to the PCI. Of course, the RRM-RS antenna port number information, the RRM-RS antenna port mapping information and the information related to the corresponding RRM-RS transmission period/offset may also be implicitly mapped (i.e., fixed).

However, it may be preferable that the RRM-RS antenna port number information or the information related to the RRM-RS transmission period/offset is provided for each individual cell (i.e., for each PCI) as the system information described above. In this case, when the configuration information that 32 antenna port RRM-RSs are transmitted with a period of 40 ms and an offset of 5 ms is provided as the system information, the position of "reference resource" may be predefined as the meaning of a specific reference RE position in a specific subframe. That is, the relation that 32 antenna ports are sequentially mapped from the reference RE position as a starting point which is fixedly defined by the PCI may be predefined. Accordingly, all of the RS mapping positions for 32 antenna ports are defined from the corresponding RE position. In the case that all of the RRM-RS transmission of 1-cycle is unable to be transmitted in single subframe but transmitted in multiple subframes, it may be defined that the reference RE position is applied to the first subframe among the multiple subframes.

The UE that receives the RRM-RS configuration information performs an RRM measurement based on the RRM-RS configuration information. That is, before transmitting a RACH (i.e., PRACH) based on the RRM-RS configuration information (i.e., before initiating a random access procedure), the UE may perform the RRM measurement for the multiple RRM-RS ports.

3. Preferred cell determination in an aspect of a UE according to the performance of an enhanced RRM measurement like an RRM-RS, and so on FIG. 16 is a diagram illustrating an RRM measurement method according to an embodiment of the present invention.

Referring to FIG. 16, a UE measures an RRM (e.g., RSRP, RSRQ, etc.) based on a cell-specific reference signal (CRS) and/or an RRM reference signal (RRM-RS) transmitted from an eNB (step, S1601).

The UE selects a cell based on the CRS-based RRM measurement value and/or the RRM-RS based RRM measurement value (S1602).

The UE (re)selects a cell based on a CRS-based RRM measurement value and/or an RRM-RS-based RRM measurement value from a cell searched through an initial cell search procedure or a serving cell of the UE (or a cell currently camped by the UE), a cell adjacent to the cell searched by the UE or the cell adjacent to the serving cell of the UE. Later, an UE in the RRC_IDLE performs the initial access procedure to the (re)selected cell or camps on the corresponding cell. In addition, an UE in the RRC_CONNECTED may perform the handover procedure to the (re)selected cell.

More particularly, based on the RRM-RS related configuration information described above, the UE performs a separate RRM measurement for multiple RRM-RS ports. As described above, such an RRM measurement may not be limited to a single target cell, but may performed by including the RRM-RSs transmitted by neighbor candidate cells.

For example, after performing the RRM-RS-based RRM measurement for RRM-RS set 1 and RRM-RS set 2 transmitted from cell 1 (PCI 1) and cell 2 (PCI 2), respectively, the UE detects the RRM-RS port that represents the best RRM (e.g., RSRP, RSRQ, etc.) measurement value for each set.

And, the UE may initiate an initial access (e.g., the RACH procedure following the RACH preamble transmission) to the cell that transmits the RRM-RS representing the greatest RRM-RS-based RRM value (i.e., the best value) among them. That is, the UE may start the random access procedure (i.e., RACH procedure) by transmitting an RACH preamble to the corresponding cell. Otherwise, the UE in the RRC_IDLE may camp on the corresponding cell by selecting or reselecting the cell that transmits the RRM-RS representing the greatest RRM-RS-based RRM value (i.e., the best value). In addition, the UE in the RRC_CONNECTED may perform the handover to the cell that transmits the RRM-RS representing the greatest RRM-RS-based RRM value (i.e., the best value).

The UE in the RRC_IDLE state should select a cell of a proper quality always and be ready to be provided with a service through the cell. For example, a UE that is just turned on should select a cell of a proper quality in order to register to a network. When the UE in the RRC_CONNECTED state enters the RRC_IDLE state, the UE should select a cell to stay in the RRC_IDLE state. As such, the procedure of selecting a cell that satisfies a certain condition in order for the UE to stay in the service standby state like the RRC_IDLE state is called a cell selection.

And, after the UE selects a cell through the cell selection procedure, the signal strength or quality between the UE and an eNB may be changed owing to the change of the mobility of UE or radio environment. Accordingly, in the case that the quality of the selected cell is degraded, the UE may select another cell that provides better quality. In the case of reselecting a cell as such, a UE selects a cell that provides better signal quality than the currently selected cell, generally. Such a procedure is called a cell reselection.

Hereinafter, for the convenience description, selecting a (initial access) target cell may be interpreted as a meaning of selecting a cell for a UE to initiate an RACH procedure, selecting or reselecting a camping cell for an UE in the RRC_IDLE, or selecting a target cell for performing the handover for an UE in the RRC_CONNECTED.

Otherwise, in addition to the method of transmitting the RACH preamble (i.e., initiating the random access procedure) to the cell that transmits a specific RRM-RS that represents the best RRM-RS-based RRM measurement value, a specific function (or rule) form may be predefined or configured to the UE for determining the best initial access target cell by comparing the RRM-RS-based RRM measurement value with the CRS-based RRM measurement value transmitted from the corresponding cell together.

For example, in the case that the CRS-based RRM measurement value of the cell that transmits a specific RRM-RS that represents the best RRM-RS-based RRM measurement value is worse (smaller) than the threshold value (i.e., Y dB) difference in comparison with the CRS-based RRM measurement value (e.g., the greatest CRS-based RRM measurement value) from other cell, a specific threshold value Y may be defined with the condition (or rule) that the corresponding cell should not be a target cell, and so on. As such, in the case that the cell that transmits a specific RRM-RS that represents the best RRM-RS-based RRM measurement value is excluded from a target cell, a UE may select the cell that has the next greatest RRM-RS-based RRM measurement value. In the case that the reception quality for a basic control channel (e.g., PDCCH) transmission of the corresponding cell is too low, it is designed for preventing from accessing to the cell.

As another example, a UE may also select the best target cell by taking a specific weighted average between the RRM-RS-based RRM measurement value and the CRS-based RRM measurement value transmitted by the corresponding cell. That is, the UE may select the cell that has the greatest weighted average value of the RRM-RS-based RRM measurement value and the CRS-based RRM measurement value as a target cell.

In this case, the weight value for the weighted average may be predefined. In addition, the weight value may be allowed in the range of UE implementation, but the verification may be performed for the performance by a specific test vector when testing a UE.

As another example, when the detected CRS-based RRM measurement values for each cell are arranged in order of size, for example, in order of C1 (e.g., with respect to PCI 7) of the greatest measurement value, C2 (e.g., with respect to PCI 9) of the next greatest measurement value, C3 (e.g., with respect to PCI 6), C4 (e.g., with respect to PCI 5), and so on, the RRM measurement values of C4 or smaller that exceed the threshold value Y as C1–C4>Y may be excluded from the target cell. That is, the cell of which difference from the greatest CRS-based RRM measurement value is (or less than) the threshold value or smaller may be determined to be a target cell candidate. Accordingly, in the above case, each cell (a cell having PCI 7, PCI 9 or PCI 6) corresponding to the CRS-based RRM measurement value of C1, C2 and C3 may be considered as a target cell candidate. And, a UE may select the cell of which RRM-RS-based RRM measurement value is the greatest as a target cell among the target cell candidates.

According to the conventional operation, it is preferable that a UE initiates an initial access to PCI 7 cell that has C1 value. However, according to another embodiment of the present invention, each of C1, C2 and C3 values may be additionally compared with the calculated best RRM-RS-based RRM measurement values among the RRM-RSs transmitted from each cell.

For example, it is assumed that among the RRM-RSs transmitted from PCI 7 cell that represents C1 value, the best RRM measurement value is R1, among the RRM-RSs transmitted from PCI 9 cell that represents C2 value, the best RRM measurement value is R2, and among the RRM-RSs transmitted from PCI 6 cell that represents C3 value, the best RRM measurement value is R3. And, it is assumed that R2=max{R1, R2, R3}, and R2>R3>R1 when they are arranged in order of size. And, assuming that R2=max {R1, R2, R3}, it is assumed that R2>R3>R1 in order of size.

In this case, consequently, a standard rule may be predetermined or configured to a UE in which cell an initial access is to be initiated.

For this, by subdividing the threshold value Y in advance, the subdivided threshold value in the form of 0<Y1<Y2< . . . <Yn<Y may be predefined or configured to a UE. For example, for the convenience of description, it is assumed that n=3. Then, the subdivided threshold values Y1, Y2 and Y3 that satisfy the condition 0<Y1<Y2<Y3<Y may be predefined or configured to a UE.

In addition, similarly, for comparing the R1, R2 and R3 values, threshold values of 0 <Z1<Z2< . . . <Zm<Z may be predefined or configured to a UE. For example, for the convenience of description, it is assumed that n=3. Then, the subdivided threshold values Z1, Z2 and Z3 that satisfy the condition 0<Z1<Z2<Z3<Z may be predefined or configured to a UE.

For example, a specific clear operation may be defined such that an initial access is to be initiated to other cell, not PCI 7 cell that represents the best CRS-based RRM measurement value C1 only in the case that the following form of rule is satisfied.

Hereinafter, the rule described above will be exemplified.

(1) In the case that Ci for a specific cell i is in the range of Y3≤C1–Ci<Y, only in the case that Ri for the corresponding cell i is 0≤max_j{Rj}–Ri<Z1, the corresponding cell i may be selected as an initial access target cell.

(2) In the case that Ci for a specific cell i is in the range of Y2≤C1–Ci<Y3, only in the case that Ri for the corresponding cell i is 0≤max_j{Rj}–Ri<Z2, the corresponding cell i may be selected as an initial access target cell.

(3) In the case that Ci for a specific cell i is in the range of Y1<C1–Ci<Y2, only in the case that Ri for the corresponding cell i is 0≤max_j {Rj}–Ri<Z3, the corresponding cell i may be selected as an initial access target cell.

(4) In the case that Ci for a specific cell i is in the range of 0<C1–Ci<Y1, only in the case that Ri for the corresponding cell i is 0≤max_j {Rj}–Ri<Z, the corresponding cell i may be selected as an initial access target cell.

In the above mathematical expressions, an initial access target cell may be selected based on the difference between the best CRS-based RRM measurement value and the CRS-based RRM measurement value for the measurement target cell, and the difference between the best RRM-RS-based RRM measurement value and the best RRM-RS-based measurement value of the measurement target cell. In other words, when the difference between the greatest CRS-based RRM measurement value and the CRS-based RRM measurement value of a specific cell is relatively great, only in the case that the greatest RRM-RS-based RRM measurement value and the RRM-RS-based RRM measurement value of the corresponding specific cell is relatively small, the corresponding specific cell may be selected as a target cell. On the contrary, when the difference between the greatest CRS-based RRM measurement value and the CRS-based RRM measurement value of a specific cell is relatively small, even in the case that the greatest RRM-RS-based RRM measurement value and the RRM-RS-based RRM measurement value of the corresponding specific cell is relatively great, the corresponding specific cell may be selected as a target cell. Consequently, a UE may select any one of the CRS-based RRM measurement value or the RRM-RS-based RRM measurement value that is good cell as a target cell.

In the situation that a plurality of conditions among (1), (2), (3) and (4) conditions is satisfied, the cell that represents the greatest Ri value may be determined to be a target cell of the initial access and an RACH preamble may be transmitted. In addition, the cell that represents the greatest Ri value of the UE in the RRC_IDLE may be selected or reselected.

The rule is just an example, but the present invention is not limited thereto. That is, the detailed conditional mathematical expression for determining an initial access target cell by considering the CRS-based RRM values (i.e., C1, C2, C3, etc.) and the RRM-RS-based RRM values (i.e., R1, R2, R3, etc.) simultaneously may be modified.

As described above, in the case that an initial access is initiated by determining the best target cell based on the RRM-RS-based RRM measurement value only, not determining the best target cell considering the CRM-based RRM measurement value together, the control channel such as a common control channel may be utilized in the system (e.g., a new carrier type (NCT) in which a CRS and a PDCCH are not existed) in which a control may be performed through only a UE-dedicated control channel (e.g., EPDCCH) directly, later.

In this case, the EPDCCH configuration related information may also notified to UEs in advance to the system information (or initial time on the RACH procedure) such as the SIB x. For example, through the system information, distributed EPDCCH related configuration information may be provided to a UE first. Later, when the UE is reported that a specific RRM-RS represents the best RRM measurement value, based on it, an eNB may provide more optimized localized EPDCCH related configuration information to the UE, and the control information by the localized EPDCCH may be transferred.

4. Additional Improved Operation on the RACH Procedure

FIG. 17 is a diagram illustrating a random access procedure according to an embodiment of the present invention.

Hereinafter, for the convenience of description, the random access procedure according to an embodiment of the present invention is compared with the random access procedure according to FIG. 8, and the different part will be mainly described. And the description not described herein may be substituted by the random access procedure according to FIG. 8.

1) Step 1 (a UE Transmits an RACH Preamble)

A UE determines a target cell that transmits an RACH preamble by applying at least one of the methods described in "3. Preferred cell determination in an aspect of a UE according to the performance of an enhanced RRM measurement like an RRM-RS, and so on" described above, and transmits the RACH preamble (i.e., message 1) to the corresponding target cell (step, S1701).

In this case, the UE that reports the RRM measurement value (e.g., RRM-RS-based RRM measurement value and/or CRS-based RRM measurement value) may select the RACH preamble in the RACH preamble set, different from the legacy UE, such that the UE is distinguished from the legacy UE. Accordingly, an eNB may determine whether the corresponding UE is the UE that reports the RRM measurement value in the RACH procedure according to the RACH preamble configured to which the RACH preamble received from the UE is belonged. As such, in the case that the UE that reports the RRM measurement value in the RACH procedure and the legacy UE use different RACH preamble sets, the eNB may transmit the RACH preamble set information in the system information. For example, the eNB may transmit the RACH preamble set information for the UE that performs the RRM-RS-based RRM measurement in step, S1501 of FIG. 15 above and/or the legacy UE.

2) Step 2 (Receive a Random Access Response (RAR) from the eNB)

The eNB transmits a response to the RACH preamble transmitted from the corresponding UE through message 2 (i.e., RAR) (step, S1702).

In the present step, since the corresponding UE does not know the information of the enhanced UE (i.e., the UE that performs the RRM-RS-base RRM measurement) that is available to support the FD-MIMO, and so on, the eNB may provide message 2 response that is the same form for the legacy UE.

Otherwise, as described above, in the case that the UE transmitting the RRM measurement value in the RACH procedure and the legacy UE select the RACH preamble in different RACH preamble sets, message 2 transmitted to the UE transmitting the RRM measurement value in the RACH procedure and the legacy UE may have different formats with each other. For example, in the case that the formats of message 2 are distinguished as such, only message 2 transmitted to the UE transmitting the RRM measurement value in the RACH procedure may include threshold value Z that will be described below. In addition, the eNB may allocate time/frequency resource to the UE transmitting the RRM measurement value in the RACH procedure considering that the corresponding UE transmits message 3 including an RRM measurement value that will be described below.

3) Step 3 (the UE Transmits L2 (Layer 2)/L3 (Layer 3) Message)

The UE transmits a UL message (i.e., message 3) through a PUSCH in response to the RAR received from the eNB in step, S1702 (step, S1703).

In this case, the UE may transmit a PUSCH through (temporal) C-RNTI provided through the RAR from the eNB in step, S1702.

According to an embodiment of the present invention, the UE may report the RRM measurement value measured based on a reference signal to the eNB through message 3. In this case, the RRM measurement value may correspond to the RRM-RS-based measurement values described above, the CRS-based RRM measurement values, or both of the RRM-RS-based measurement value and the CRS-based RRM measurement value.

For example, it may be configured to report all of the RRM-RS configurations transmitted by a target cell that transmits message 3 currently and the RRM measurement values for all ports. Through this, there is an advantage that the corresponding cell may efficiently configure a CSI-RS based on the reported information when performing the CSI-RS configurations proper to the UE later.

Otherwise, it may be defined to report the RRM-RS measurement values within Z dB in comparison with the best RRM-RS measurement value, not to report all RRM-RS measurement values.

In this case, threshold value Z may be fixedly predefined or indicated by the eNB through the RAR message in step, S1702 above. In this case, the information may be handled as the information that is understandable by the enhanced UE only.

In addition, when the UE reports the RRM-RS measurement value as such, the PCI of the cell transmitting the RRM-RS can be reported together as the linkage information.

This has an advantage that the level of interference from neighbor cells exerted to the corresponding UE may be recognized in advance, when the RRM-RS measurement value for the RRM-RS transmitted by the neighbor cell as well as the target cell shows a high value higher than a specific level (e.g., within threshold value Z'), and through this, may be utilized as a reference for CSI process related configuration, and so on.

As such, the time that the UE reports the RRM-RS-based measurement values and/or the CRS-based RRM measurement values to the eNB may be in a later step, not in the step of transmitting message 3 (i.e., step, S1703). In this case, the UE may transmit message 3 with an indicator (e.g., 1 bit indicator) for indicating that the UE is going to report RRM-RS-based measurement values and/or the CRS-based RRM measurement values to the eNB.

For example, the existing operation is defined such that the UE transmits a positive ACKnowledgement (i.e., 'ACK') to the eNB after the UE receives message 4 from the eNB (and in the case that the eNB confirms a collision resolution by including an indicator of the UE in message 4). The transmission time may be defined so as to report the RRM-RS-based measurement values and the CRS-based RRM measurement values to the eNB with being linked to the time.

That is, when the time of sending such an ACK is subframe (SF) #n, it may be defined (e.g., by a PUSCH) that the UE transmits the RRM-RS-based measurement values and the CRS-based RRM measurement values to the same SF #n.

Or, in the case that a specific SF offset k value is predefined or indicated by a precedent message (e.g., system information or message 2, etc.), it may predefined or configured to the UE to transmit the RRM-RS-based measurement values and the CRS-based RRM measurement values on the SF #n+k time by applying the corresponding k value.

Or, it may also defined that the RRM-RS-based measurement values and the CRS-based RRM measurement values are transmitted on the corresponding time according to an explicit triggering (e.g., UL grant) from the eNB. In other words, in this case, the UE may receive a specific UL grant from the eNB after all RACH procedures are completed (e.g., it follows a specific protocol signaling form such as a specific explicit or implicit field indication is included in the corresponding UL grant or masked by a separate RNTI). And, it may be defined or configured to the UE so as to transmit the information on the time (i.e., in response to the UL grant) of receiving a specific UL grant indicating to transmit the RRM-RS-based measurement values and the CRS-based RRM measurement values to the eNB.

4) Step 4 (Receive a Contention Resolution Message from the eNB)

The eNB may transmit a contention resolution message (i.e., message 4) to the UE. This step may follow the method according to the example of FIG. 8 as it is.

Or, according to another embodiment of the present invention, simultaneously with this step, i.e., within the contention resolution message (i.e., message 4), the eNB may provide the transport mode configuration and the CSI feedback related configuration information to the corresponding UE directly by considering the RRM-RS-based RRM report information in message 3 step.

Through the procedure, according to the present invention, there is an advantage of entering the normal operation state quickly without additional handover or cell reselection procedure for a normal transmission mode configuration and CSI feedback of the UE, and a transmission/reception operation.

In the description of the present invention, for the convenience of description, the case of applying FD-MIMO is mainly described. However, it is understood that the present invention may also be applied to various application cases such as a plurality of RRM-RS configurations in an amorphous cells (i.e., the form of transmitting each RRM-RS together with different numbers of TP(s) according to the construction of the amorphous cell with different number of TP(s)) as described above. In addition, the present invention may be applied to other various environments in which an initial access is performed based on the RRM measurement value from separate other RSs (referred to as RRM-RS above for the convenience of description), not based on the existing method that a target cell for the initial access is configured based on a single CRS-based RRM measurement value for each cell.

In sections 1 to 4 above, for the convenience of description, the situation that the UE performs an initial access to a network is assumed and described. However, it is understood that the methods of sections 1 to 4 are not necessarily sequentially applied only in the initial access procedure of the UE, but each of the methods may be independently performed.

The method of section 2 above is not necessarily limited to the system information that the UE receives from the eNB before the initial access to a network, but the RRM-RS configuration information may be provided to the UE through any types of system information broadcasted from the eNB.

In addition, the method of section 3 above is not necessarily limited to the case that the UE selects a cell before the initial access to a network, but the method may be applied to any situation for selecting the best cell such as (re)selecting or handover the cell on which the UE is camped.

Furthermore, the method of section 4 above is not necessarily limited to the RACH procedure for the UE to perform the initial access to a network, but may be applied to any type of RACH procedure performed by the UE. In addition, the method of section 4 may be applied to the legacy UE in order to transmit the CRS-based RRM measurement value to the eNB.

General Apparatus to which the Present Invention May be Applied

FIG. 18 illustrates a block diagram of a wireless communication apparatus according to an embodiment of the present invention.

Referring to FIG. 18, the wireless communication system includes a base station (eNB) 1810 and a plurality of user equipments (UEs) 1820 located within the region of the eNB 1810.

The eNB 1810 includes a processor 1811, a memory 1812 and a radio frequency unit 1813. The processor 1811 implements the functions, processes and/or methods proposed in FIGS. 1 to 17 above. The layers of wireless interface protocol may be implemented by the processor 1811. The memory 1812 is connected to the processor 1811, and stores various types of information for driving the processor 1811. The RF unit 1813 is connected to the processor 1811, and transmits and/or receives radio signals.

The UE 1820 includes a processor 1821, a memory 1822 and a radio frequency unit 1823. The processor 1821 implements the functions, processes and/or methods proposed in FIGS. 1 to 17 above. The layers of wireless interface protocol may be implemented by the processor 1821. The memory 1822 is connected to the processor 1821, and stores various types of information for driving the processor 1821. The RF unit 1823 is connected to the processor 1821, and transmits and/or receives radio signals.

The memories 1812 and 1822 may be located interior or exterior of the processors 1811 and 1821, and may be connected to the processors 1811 and 1821 with well known means. In addition, the eNB 1810 and/or the UE 1820 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The method for a UE to select a cell in a wireless communication system of the present invention has been described mainly with the example applied to 3GPP LTE/LTE-A system, but may also be applied to various wireless communication systems except the 3GPP LTE/LTE-A system.

What is claimed is:

1. A method for performing a random access procedure by a user equipment (UE) in a wireless communication system, comprising:
receiving, from a base station (BS), system information including Radio resource management-Reference signal (RRM-RS) configuration information of a neighbor cell and a serving cell, wherein the RRM configuration information includes a Physical Cell Identity (PCI) of each cell;
performing a Radio resource management (RRM) measurement based on the RRM-RS configuration information;
transmitting, to the BS, a random access preamble, wherein the BS is on a cell selected by the UE based on the RRM measurement;
receiving, from the BS, a random access response; and
in response to the random access response, transmitting, to the BS, a reporting message on a Physical Uplink Shared Channel (PUSCH),
wherein the reporting message includes a Radio resource management (RRM) measurement value, which is measured based on a reference signal (RS) and a preconfigured threshold value,
wherein the RRM measurement value is reported with a PCI of the cell, and
wherein the RRM measurement value includes a Cell-specific Reference Signal (CRS)-based RRM measurement value and/or a RRM-RS-based RRM measurement value configured for the RRM measurement.

2. The method of claim 1, wherein the RRM-RS configuration information includes one or more of RRM-RS antenna port number information, RRM-RS antenna port mapping information, RRM-RS transmission period and offset information, or RRM-RS transmission frequency/time resource information.

3. The method of claim 1, wherein the RRM-RS configuration information is corresponding to a PCI of each cell.

4. The method of claim 1, wherein the cell is selected, by the UE, based on the CRS-based RRM measurement value and/or the RRM-RS-based RRM measurement value for each cell.

5. The method of claim 4, wherein a cell that transmits a RRM-RS of which RRM-RS-based RRM measurement value is a greatest is selected.

6. The method of claim 5, when a CRS-based RRM measurement value for a cell that transmits a RRM-RS of which RRM-RS-based RRM measurement value is a greatest is smaller than a CRS-based RRM measurement value or other cell by more than a preconfigured threshold value, wherein a cell that transmits a RRM-RS of which RRM-RS-based RRM measurement value is a greatest is not selected.

7. The method of claim 4, wherein a cell of which a weighted average value between the RRM-RS-based RRM measurement value and the CRS-based RRM measurement value is a greatest is selected.

8. The method of claim 4, wherein a cell is selected based on the RRM-RS-based RRM measurement value among cells of which difference between a best CRS-based RRM measurement value and a CRS-based RRM measurement value for a measurement target cell is a preconfigured threshold value or less.

9. The method of claim 4, wherein a cell is selected based on difference between a best CRS-based RRM measurement value and a CRS-based RRM measurement value for a measurement target cell, and difference between a best RRM-RS-based RRM measurement value and a RRM-RS-based measurement value for the measurement target cell.

10. The method of claim 1, wherein the RRM includes a Reference signal receive power (RSRP) and/or a Reference signal received quality (RSRQ).

11. The method of claim 1, wherein the RRM-RS is one of a Channel State Information-Reference Signal (CSI-RS), a Discovery Reference Signal (DRS), a precoded reference signal or a reference signal transmitted in an amorphous cell including a number of different cells or transmission points.

12. The method of claim 1, further comprising
receiving, from the BS, the preconfigured threshold value with the random access response.

13. A user equipment (UE) for performing a random access procedure selecting a cell in a wireless communication system, comprising:
a radio frequency (RF) unit for transmitting and receiving a wireless signal; and
a processor for controlling the RF unit,
wherein the processor is configured to perform:
receiving system information including Radio resource management-Reference signal (RRM-RS) configuration information of a neighbor cell and a serving cell, wherein the RRM configuration information includes a Physical Cell Identity(PCI) of each cell;
performing a Radio resource management(RRM) measurement based on the RRM-RS configuration information;
transmitting a random access preamble to a base station (BS) on a cell selected by the UE based on the RRM measurement;
receiving a random access response from the BS; and
in response to the random access response, transmitting a reporting message on a Physical Uplink Shared Channel (PUSCH) to the BS,
wherein the reporting message includes a Radio resource management (RRM) measurement value, which is measured based on a reference signal (RS) and a preconfigured threshold value,
wherein the RRM measurement value is reported with a PCI of the cell, and
wherein the RRM measurement value includes a Cell-specific Reference Signal (CRS)-based RRM measurement value and/or a RRM-RS-based RRM measurement value configured for the RRM measurement.

* * * * *